US011588532B2

(12) United States Patent
Gupta et al.

(10) Patent No.: US 11,588,532 B2
(45) Date of Patent: Feb. 21, 2023

(54) TIME-BASED CIRCUITS AND SYSTEMS FOR WIDEBAND SPATIAL SIGNAL PROCESSING

(71) Applicant: WASHINGTON STATE UNIVERSITY, Pullman, WA (US)

(72) Inventors: Subhanshu Gupta, Pullman, WA (US); Erfan Ghaderi, Hillsboro, OR (US)

(73) Assignee: WASHINGTON STATE UNIVERSITY, Pullman, WA (US)

( * ) Notice: Subject to any disclaimer, the term of this patent is extended or adjusted under 35 U.S.C. 154(b) by 32 days.

(21) Appl. No.: 17/307,008

(22) Filed: May 4, 2021

(65) Prior Publication Data
US 2021/0344400 A1 Nov. 4, 2021

Related U.S. Application Data

(60) Provisional application No. 63/123,614, filed on Dec. 10, 2020, provisional application No. 63/019,750, filed on May 4, 2020.

(51) Int. Cl.
H04B 7/06 (2006.01)
G04F 10/00 (2006.01)
H04L 25/03 (2006.01)
H01Q 3/26 (2006.01)
H01Q 3/36 (2006.01)

(52) U.S. Cl.
CPC ......... *H04B 7/0639* (2013.01); *G04F 10/005* (2013.01); *H01Q 3/2611* (2013.01); *H01Q 3/36* (2013.01); *H04L 25/03891* (2013.01)

(58) Field of Classification Search
CPC ... H04B 7/0639; H04B 7/0842; G04F 10/005; H01Q 3/2611; H01Q 3/36; H04L 25/03891
USPC .......................................................... 375/262
See application file for complete search history.

(56) References Cited

U.S. PATENT DOCUMENTS 9,673,835 B1\* 6/2017 Kinyua ............... H03M 1/0607
2021/0226643 A1\* 7/2021 Moon ................. H03M 1/0695

\* cited by examiner

Primary Examiner — Fitwi Y Hailegiorgis
(74) Attorney, Agent, or Firm — WCF IP

(57) ABSTRACT

An N-element baseband (BB) time-domain spatial signal processor system and methodology for large modulated bandwidth multi-antenna receivers are provided. Such a processor generally includes a pipeline converter configured as an asynchronous time-to-digital converter, wherein the asynchronous time-to-digital converter arrangement generates a residue value and an asynchronous pulse and is further arranged to amplify the residue value so as to result in an amplified residue value; and a 2-bit flash time-to-digital-converter configured to quantize the amplified residue value. Thus, a true-time delay spatial signal processing system and technique in the time-domain that enables beamforming, beam-nulling and multiple independent interference cancellation after time-alignment of signals using cascaded voltage-to-time converters and quantization using relaxed pipeline time-to-digital converters is presented.

21 Claims, 16 Drawing Sheets

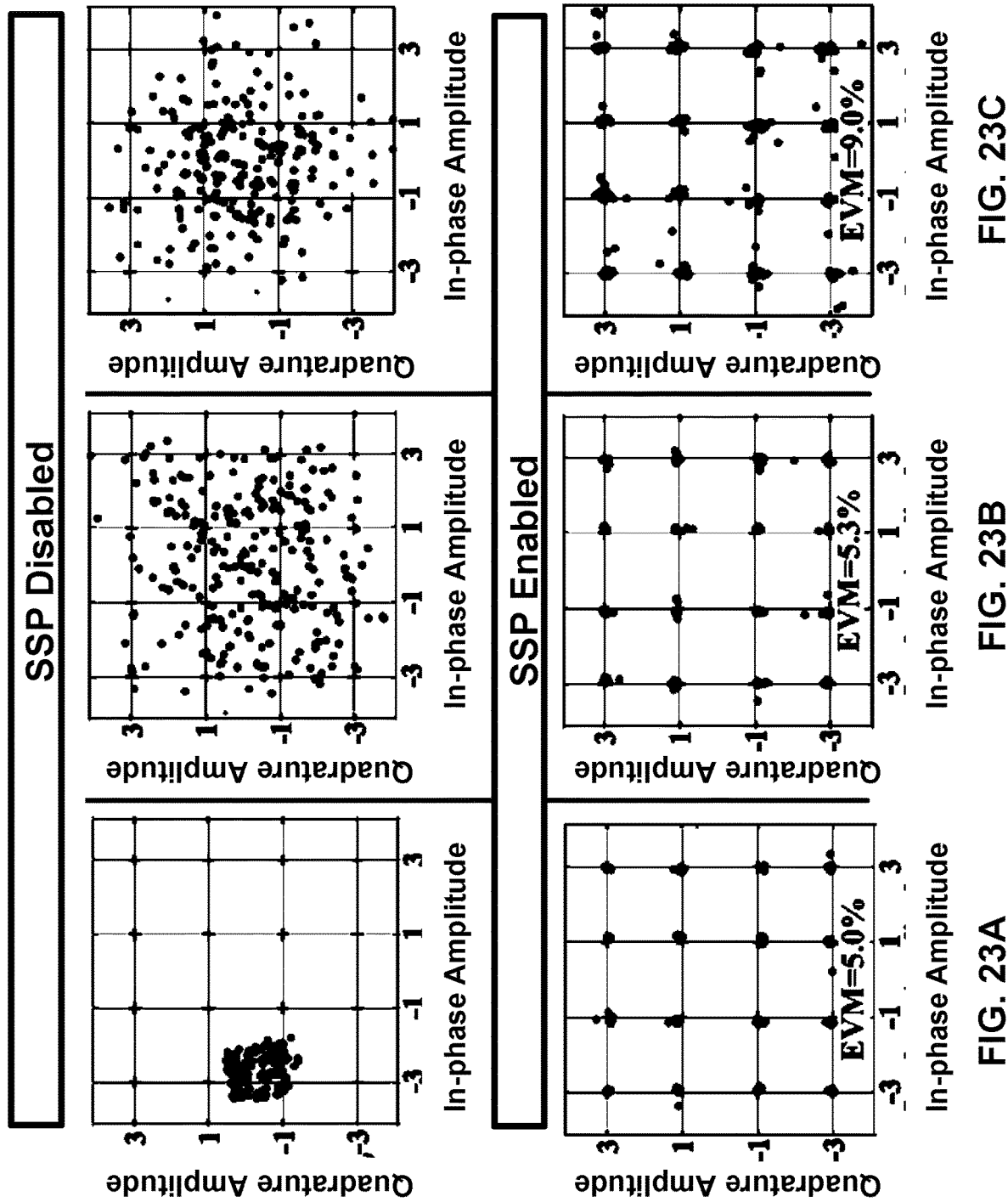

TIME-BASED CIRCUITS AND SYSTEMS FOR WIDEBAND SPATIAL SIGNAL PROCESSING

CROSS-REFERENCE TO RELATED APPLICATION(S)

The present application claims under 35 U.S.C. § 119, the priority benefit of U.S. Provisional Application No. 63/019,750, filed May 4, 2020, entitled "Time-based circuits and systems for wideband spatial signal processing," and U.S. Provisional Application No. 63/123,614, filed Dec. 10, 2020, entitled "A 4-Element 500 MHz 40 mW 6-bit ADC enabled Time-Domain Spatial Signal Processor," both of which are incorporated herein by reference in its entirety.

GOVERNMENT INTERESTS

This invention was made with government support under grant numbers 1705026 and 1944688 awarded by National Science Foundation. The government has certain rights in the invention.

FIELD OF THE INVENTION

The present embodiments herein relate to time-domain spatial signal processing for large, modulated bandwidths multi-antenna receivers. In particular, the present system and method embodiments disclosed herein enable a true-time delay spatial signal processing technique that enables beamforming, beam-nulling and multiple independent interference cancellation in a large modulated bandwidth multi-antenna receiver.

BACKGROUND OF THE INVENTION

Discussion of the Related Art

Spatial signal processing in multi-antenna receivers offers higher received power and signal-to-noise ratio (SNR) because of higher number of reception antennas. It also enables spatial diversity and simultaneous communication with multiple devices. For the past several years, integrated multi-antenna receivers have been implemented by approximating the time-delay with a phase shift element. However, the frequency-dependent approximation of true-time-delay (TTD) with a phase-shift element results in beam-squinting in the angular domain and limited fractional bandwidth in the frequency domain Implementation of TTD with a Spatial Signal Processor (SSP) results in frequency-uniform processing. This translates to beam-squinting free beamforming or beam-nulling.

The beam-squint issue has its parallel in beam-nulling arrays handling wide modulated bandwidths. The state-of-the-art phase-shifter-based arrays targeting beam-nulling have limited rejection capability towards wideband interference. Difficulty to steer a deep null towards interference for array gain variation at different frequency components being one plausible reason. This results in interference leakage and significantly higher dynamic range requirements for the baseband and the analog-to-digital converter (ADC) for multiantenna receivers.

However, TTD SSP implementation in a digital domain after digitizing all channels gives complete access to the received signals at the cost of power-hungry ADCs. In contrast to the state-of-the-art approaches, TTD SSP implementation is in the baseband (BB) time-domain prior to using ADC. In addition to relaxing the ADC and the TTD elements requirements; use of digital-friendly time-based circuits and systems provides distinct contributions.

Background information on an interference cancelation methodology is described and claimed in U.S. Pat. No. 10,804,988 B2 entitled "Spatial interference cancellation for simultaneous wireless and information power transfer," granted Oct. 13, 2020, to Gupta et al, including the following, "A discrete-time delay (TD) technique in a baseband receiver array is disclosed for canceling wide modulated bandwidth spatial interference and reducing the Analog-to-Digital Conversion (ADC) dynamic range requirements. In particular, the discrete-time delay (TD) technique first aligns the interference using non-uniform sampled phases followed by uniform cancellation . . . ".

However, U.S. Pat. No. 10,804,988 B2 uses a closed-loop operational transconductance amplifier (OTA)-based charge-domain implementation for baseband signal combination and a parallel architecture that requires at least N times higher bandwidth than the operating bandwidth due to stability issues of the closed-loop implementation. In contradistinction, the embodiments herein provide for a baseband signal combination using a series architecture in the time-domain that does not impose any extra bandwidth and power requirements.

Accordingly, a need exists for a TTD N-element baseband (BB) time-domain spatial signal processor (SSP) for large, modulated BW multi-antenna receivers (RXs) with relaxed ADC requirements. The system and method embodiments address such a need herein via: the novel embodiments herein are directed to an N-element baseband (BB) time-domain spatial signal processor (SSP) for large, modulated BW multi-antenna receivers (RXs). Such an architecture enables three spatial signal processing modes: (1) beamforming by constructive signal combination; (2) beam-nulling by destructive signal combination, and (3) simultaneous spatial filtering of $\log_2 N$ independent interferences by non-uniform TTD extracted by Kronecker decomposition (fragmenting the input time-delay vector into $\log_2 N$ sub-vectors before filtering).

BRIEF SUMMARY OF THE INVENTION

In a first aspect, the embodiments herein are directed to an N-element baseband (BB) time-domain spatial signal processor that includes: a plurality of in series voltage-to-time converters integral to the N-element baseband (BB) time-domain spatial signal processor and configured to time-align and combine one or more received continuous-time baseband signals to result in one or more interference free intended signals; and a pipeline converter integral to the N-element baseband (BB) time-domain spatial signal processor and configured to quantize the intended signals received from the plurality of voltage-to-time converters.

In a second aspect, the embodiments here are directed to a time-domain spatial signal processing method that includes: time-aligning and combining constructively one or more received continuous-time baseband signals in the beam-forming mode; time-aligning and combining destructively one or more received interference signals in the beam-nulling mode, wherein a plurality of in series of voltage-to-time converters perform the time-aligning and combining of the constructively and destructively one or more received continuous-time baseband signals; and applying a Kronecker decomposition of array vectors to one or more received interference signals in the multiple independent interference filtering mode, wherein the Kronecker decomposition of array vectors cancels one or more independent interference signals.

Accordingly, a true-time delay spatial signal processing system and methodology in the time-domain that enables beamforming, beam-nulling and multiple independent interference cancellation after time-alignment of signals using cascaded voltage-to-time converters and quantization using relaxed pipeline time-to-digital converters is presented.

BRIEF DESCRIPTION OF THE DRAWINGS

FIG. 23A shows the measured constellation and evaluation of the modulated signal in beamforming mode.

FIG. 23B shows the measured constellation and evaluation of the modulated signal in beam-nulling mode.

FIG. 23C shows the measured constellation and evaluation of the modulated signal in two independent interference cancellation mode.

DETAILED DESCRIPTION OF THE DISCLOSURE

Figure 1A:
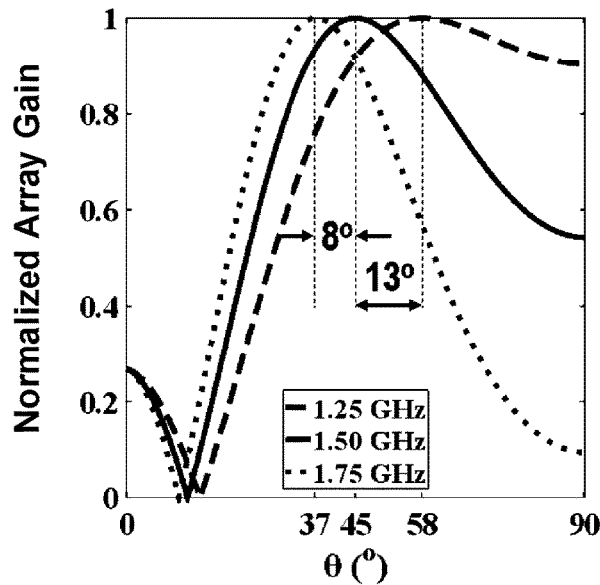
FIG. 1A shows the error due to phase shift in the angular domain over 500-MHz bandwidth for beamforming.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

Figure 1B:
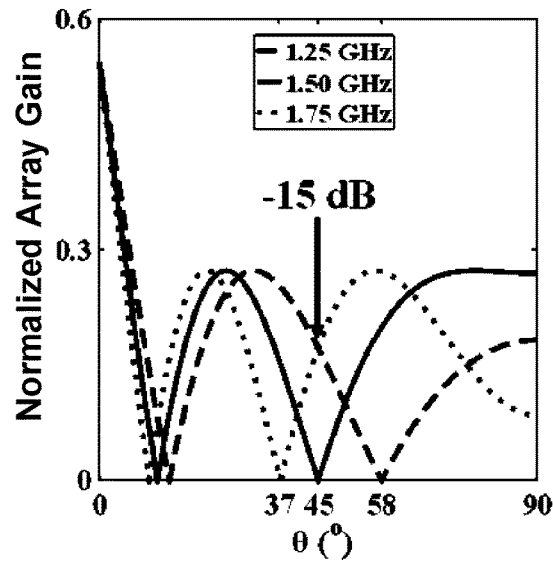
FIG. 1B shows the error due to phase shift in the angular domain over 500-MHz bandwidth for beam-nulling.

FIG. 1 illustrates an example problematic scenario of errors caused by phase-shift approximation in a linear array. Assuming, for example, a four-element array with 500-MHz modulated bandwidth and 1.5-GHz center frequency, FIG. 1A shows that approximating TTD with a phase shifter results in −8° and +13° error in the angular domain (assuming angle of arrival (AoA) of 45° at the band edge). These errors are what are known as beam-squinting in a beamformer. Also, for beam-nulling, these errors result in limiting the filtering to only, for this illustration, −15 dB, at the band edge. This can be observed in FIG. 1B. The beam-squinting error further depends on the AoA. When the AoA increases, the beam-squinting gets worse. For high angles close to ±60°, the error at the band edges is as high as 28°. This results in non-alignment with the transmitter and consequently loss in the intended AoA.

Figure 2A:
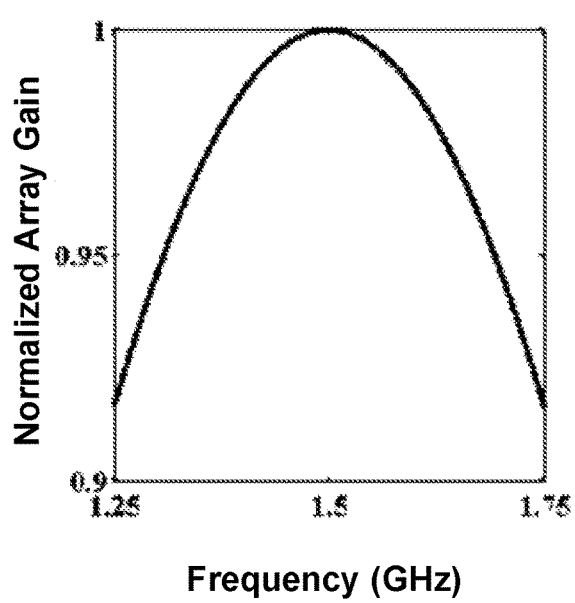
FIG. 2A shows the error due to phase shift in the frequency domain over 500-MHz bandwidth for beamforming.
Figure 2B:
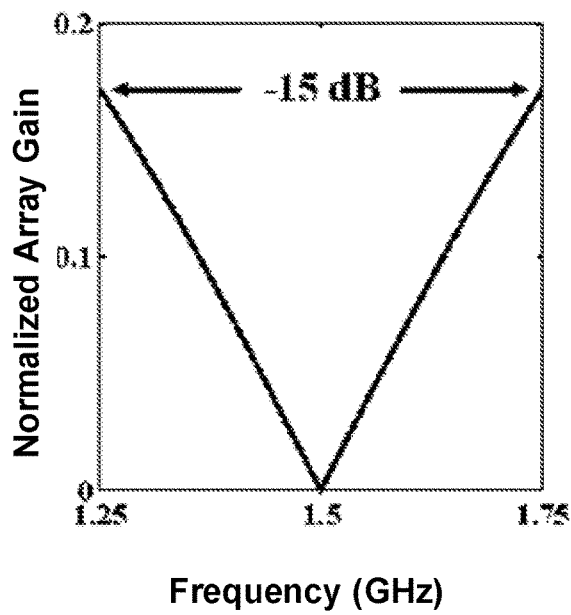
FIG. 2B shows the error due to phase shift in the frequency domain over 500-MHz bandwidth for beam-nulling.

Similarly, in the frequency domain, phase shifting results in frequency-dependent beamforming, which acts like a bandpass filter (see FIG. 2A) and affects the desired signal quality. Also, for the beam-nulling case, this approximation limits the rejection performance that, in this case, is only −15 dB at the band edges (see FIG. 2B). This problem gets significantly more severe for larger arrays.

Accordingly, to address the aforementioned problems associated with such arrayed antenna and signals structures, the novel embodiments herein are directed to an N-element baseband (BB) time-domain spatial signal processor (SSP) for large modulated BW multi-antenna receivers (RXs). Such an architecture enables three spatial signal processing modes: (1) beamforming by constructive signal combination; (2) beam-nulling by destructive signal combination, and (3) simultaneous spatial filtering of log 2N independent interferences by non-uniform TTD extracted by Kronecker decomposition (fragmenting the input time-delay vector into log 2N sub-vectors before filtering).

In this architecture, the antenna's received signals (i.e., S1, . . . , SN) are phase-shifted, down-converted, filtered, and then applied to the BB time-domain SSP. True time delay (TTD) is implemented through BB delay-compensating, wherein signal combination in the time domain is through cascaded voltage-to-time converters (VTCs). The spatially processed time-domain outcome is then applied to a pipeline time-to-digital converter (TDC) for digitization and further processing. The time-domain SSP benefits from digital-friendly implementation, therefore also benefiting from technology-scaling.

Specific Description

Figure 3:
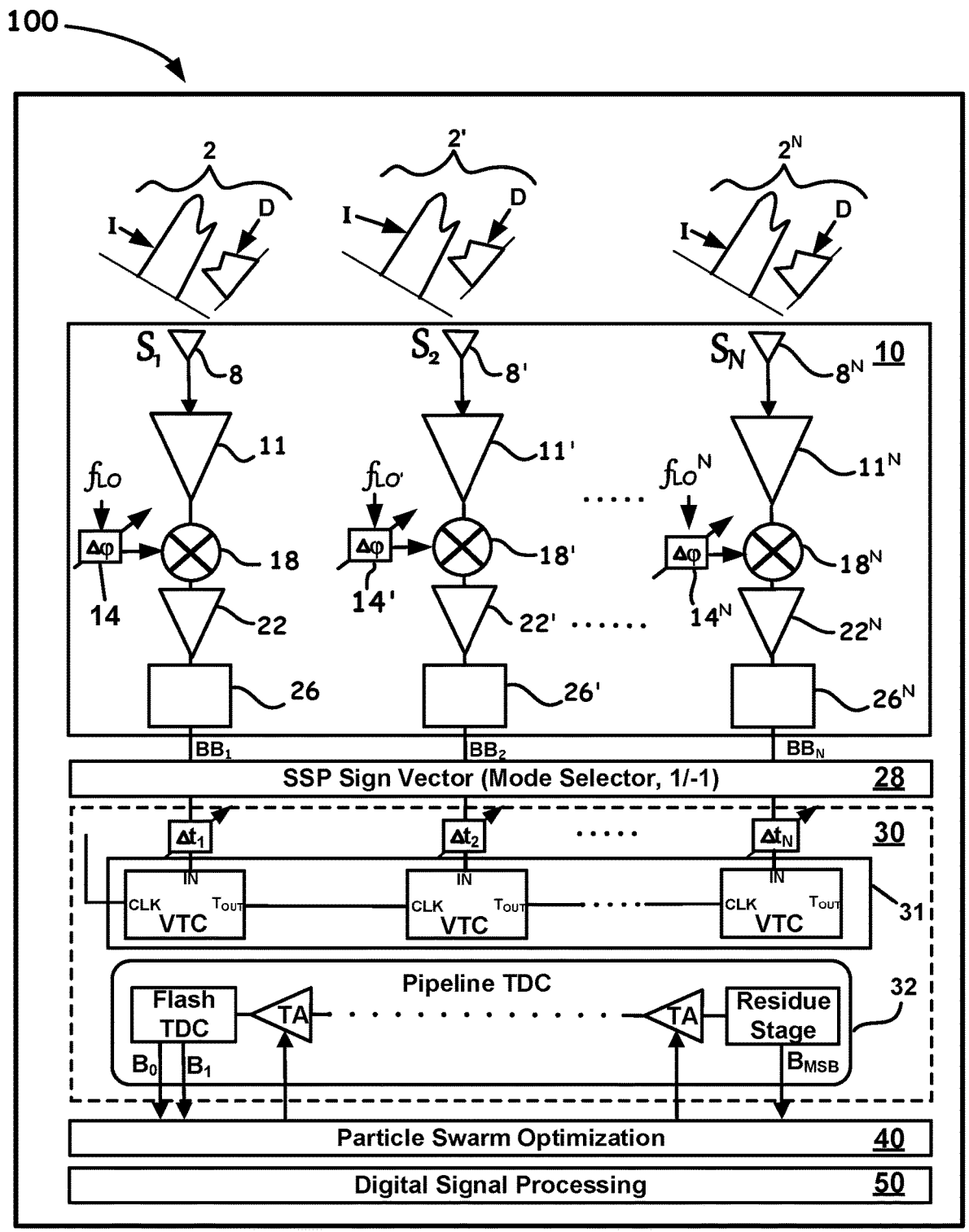
FIG. 3 shows a beneficial example system architecture of an N-element time-domain true-time-delay Spatial Signal Processor in a multi-antenna receiver, as disclosed herein.

Turning specifically to example beneficial embodiments, FIG. 3 shows a configuration of an N-element time-domain true-time-delay Spatial Signal Processor, generally referenced by the numeral 100, for large modulated bandwidth (BW) multi-antenna receivers (RXs). It is to be noted that the processor 100 illustrated in FIG. 3 is capable of being configured with receiving signals from up to 4, 8, often up to 16, and more often, up to 64 groups of antennas so as to provide up to 1500 antennas while addressing spatially separated large modulated BW signals that coexist in the same frequency channel.

It is to be appreciated that processor 100 includes a beneficial Spatial Signal Processor (SSP) block 30 (also shown enclosed by the dashed box for clarity) that incorporates a series of voltage-to-time converters (VTCs) 31 and a pipeline time-to-digital converter (TDC) 32, as known in the art but as to be discussed in detail below with respect to how utilized with the embodiments herein. It is also to be appreciated that while system 100 is utilized for illustrative purposes of the example novel embodiments of the present invention, it is to be understood that other alternative commercial and custom configurations, as briefly stated above, having various other components can also be incorporated when using the techniques of the present application when being operated within the design parameters of the invention.

In a method of operation, a plurality of signals 2, 2', . . . , $2^N$ of desired (denoted as D) and interference signals (denoted as I) (also denoted as $S_1, S_2, \ldots, S_N$) are received at each given antenna 8, 8', . . . , $8^N$ element arranged with a given true-time-delay Spatial Signal Processor 100 disclosed herein. Before being passed on to the Spatial Signal Processor (SSP) block 30 as baseband (BB) to perform beamforming, beam-nulling and multiple interreference cancellation through true-time delay (TTD) spatial signal processing (SSP), the processor (receiver) 100 utilizes pre-processing components/steps to include, but not strictly limited to, an amplifier (11, 11', . . . , $11^N$), a Local Oscillators (denoted as $f_{LO}, f_{LO}', \ldots, f_{LO}^N$), a phase shifter (14, 14', . . . , $14^N$), a mixer (18, 18', . . . , $18^N$), an additional amplifier (22, 22', . . . , $22^N$), and a filter (26, 26', . . . , $26^N$) all of which is described in detail below as an illustrative preprocessing feature of the embodiments herein. It is to be appreciated that because the spatial signal processing is being done at baseband (BB), the RF-frontend (RF-FE) (denoted as 10) is configured with substantial linearity to down-convert the received signals 2, 2', . . . , $2^N$.

In particular, after the signals 2, 2', . . . , $2^N$ are received at given antenna elements 8, 8', . . . , $8^N$, such signals are amplified using, for example, a low noise amplifier (LNA) 11, 11', . . . , $11^N$ while maintaining the signal-to-noise ratio (SNR) of the received signals (2, 2', . . . , $2^N$). A local oscillator (LO) (denoted as $f_{LO}, f_{LO}', f_{LO}^N$) is used to generate a frequency with a value of often, but not necessarily, the carrier frequency of a desired signal D at the receiver and such a generated frequency is directed into a phase shifter component 14, 14', . . . , $14^N$ operating as a pseudo-time delay element configured so as to in this arrangement, provide a phase shift of the generated frequency. It is to be noted that the pseudo-time delay (TD) element (i.e., phase shifter components 14, 14', . . . , $14^N$) in LO ($f_{LO}, f_{LO}', f_{LO}^N$), operates at a single frequency analogous to a phase shift.

Thereafter, the mixers 18, 18', . . . , $18^N$, which are known components to those skilled in the art, combines the amplified signal (current) resulting from amplifier 11, 11', . . . , $11^N$ with the phase-shifted frequency generated by the local oscillator $f_{LO}, f_{LO}', f_{LO}^N$ to enable converting the signal from RF to BB. The delay-compensation at RF is equivalent to its implementation in the BB after the down-conversion mixer and a phase shift, further processing can be realized through delay-compensation in RF or BB. The down-converted and phase-shifted signal at the output of the mixer 18, 18', . . . , 18$^N$ is thereafter directed to the amplifier 22, 22', . . . , 22$^N$, often a trans-impedance amplifier (TIA) to in this illustrative embodiment, convert the current signal to a voltage signal for further processing. The filters 26, 26', . . . , 26$^N$, often configured as anti-aliasing filters (AAF) so as to operate in this illustration as low pass filters before sampling the resultant signals, restrict the bandwidth of the signal to substantially satisfy the Nyquist-Shannon sampling theorem over the modulated BW. It is to be noted that while anti-aliasing filters (AAF) are beneficial in the embodiment shown in FIG. 3, other capable filters such, as but not limited to, a continuous-time filter, a discrete-time filter or a switched-capacitor operating as a filter can also be utilized without departing from the scope and spirit of the invention.

Continuing on with the description for processor system 100 shown in FIG. 3, after being passed through filters 26, 26', . . . , 26$^N$, the resultant BB signals are received by the spatial signal processing (SSP) block 30 having a series of voltage-to-time converters 31 (i.e., for conversion of input voltage values to a time-delay as detailed below) and the pipeline time-to-digital (TDC) block 32, also discussed in detail below. The SSP block 30 receives sign vectors from the SSP Sign Vector block 28 before processing the received BB signals. The sign vector provided to the SSP block 30 are either +1 or −1 to implement one of the SSP processing functions including beamforming or beam-nulling at the SSP block 30. The Particle Swarm Optimization (PSO) block 40 is implemented to calibrate the TDC Pipeline block 32. In general, however, the series of voltage-to-time converters 31, in the beneficial example embodiment shown in FIG. 3, is designed to provide time alignment of the BB signals through a delay compensating technique depending on system configurations. The result is beam-forming and beam-nulling, as further detailed below.

Post-processing steps/components (e.g., digital techniques in RF-FE), which are not necessarily required in some instances for the practice of the invention are thereafter utilized to reduce amplitude and phase mismatches so as to not limit the performance of the SSP invention disclosed herein. For example, and as shown in FIG. 3, such steps/components can include a Digital Signal Processing block 50.

SSP Processing Functions:

Referring to the spatial signal processing, consider an N-element uniformly spaced linear array with half-wavelength spacing, the time delay r between any two consecutive antennas can be represented as shown in Eq. 1:

$$\tau = \frac{d \cdot \sin(\theta)}{c} = \frac{\sin(\theta)}{2 \cdot f_c} \bigg|_{d=\lambda_c/2} \quad (1)$$

where, $\lambda_c$ and $f_c$ are the received signal's wavelength and center frequency, respectively. These time delays between the received signals can be expressed in the frequency domain as an array vector, V(jω), representing the antenna signals as a frequency domain vector $$S(j\omega) = L(j\omega) \cdot [1 \; e^{-j\omega\tau} \; \ldots \; e^{-j\omega(N-1)\tau}]' \cdot X(j\omega) = L(j\omega) \cdot V(j\omega) \cdot X(j\omega) \quad (2)$$

where, S(jω) is the received signals vector, scalar L(jω) captures the path loss, and scalar X(jω) is the transmitted signal. This vector representation in the frequency domain is exploited to perform various spatial signal processing functions, including beamforming, beam-nulling, and independent cancellation of multiple interferences as detailed below.

Figures 4A, 4B:
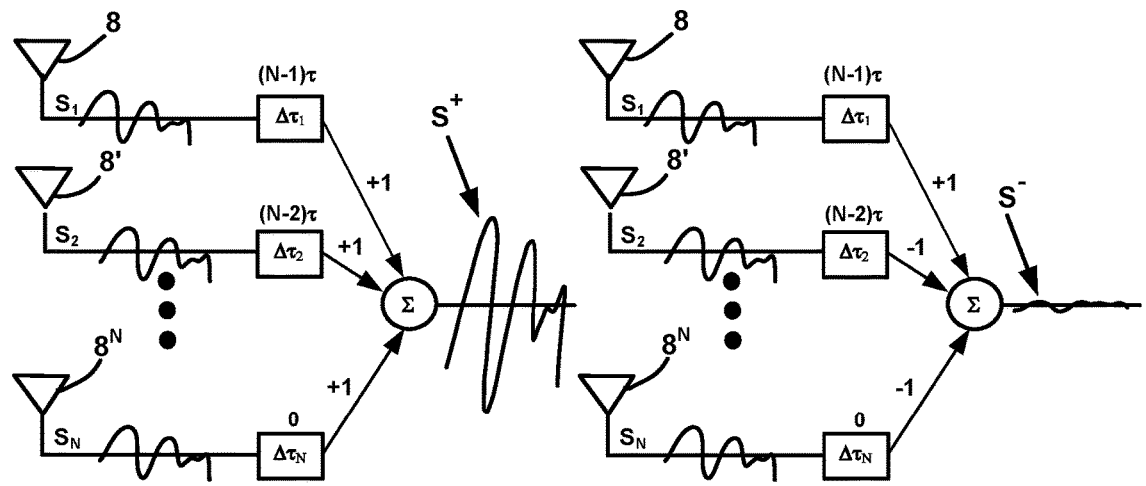
FIG. 4A shows TTD arrays for beamforming.
FIG. 4B shows TTD arrays for beam-nulling.

Beamforming:

The time-delayed received signals (e.g., S$_1$, S$_2$, and S$_N$, as shown in FIG. 4A) at the antennas (8, 8', . . . , 8$^N$) can be time-aligned first and then constructively combined to increase the power (e.g., note signal S$^+$) of the intended signal. This constructive addition is called beamforming as shown in FIG. 4A. Beamforming is expressed in the frequency domain through the vector expression as Eq. 3:

$$Y(j\omega) = [e^{-j\omega(N-1)\tau} e^{-j\omega(N-2)\tau} \; \ldots \; 1]' \cdot S(j\omega) = N \cdot e^{-j\omega(N-1)\tau} \cdot X(j\omega) \quad (3)$$

where Y(jω) is the beamforming output.

As shown by Eq. 3, the amplitude of Y is higher than the amplitude of X by a factor of N; thereby improving the signal-to-noise ratio (SNR) by a factor of N as the signal power is amplified by a factor of N$^2$ and the noise power is amplified only by factor of N.

The relation between the angle with the maximized received power and the implemented inter-element delay (τ) can be extracted from Equation 1 and written as Eq. 4:

$$\theta = \sin^{-1}(2f_c \cdot \tau). \quad (4)$$

Any deviation in the implemented inter-element time delay from the delay caused by the intended angle of arrival (AoA) results in drop in the beamforming gain. One form of deviation is the phase-shift approximation that neglects the frequency-dependency of the θ and causes non-uniform beamforming gain.

Beam-Nulling:

Opposite to beamforming described above, the time-delayed received signals (e.g., S$_1$, S$_2$, and S$_N$) at the antennas (8, 8', . . . , 8$^N$) can be time-aligned and then destructively combined to cancel the received signal (e.g., as shown as S$^-$). This destructive combination is called beam-nulling, as shown in FIG. 4B. Beam-nulling is expressed in the frequency domain through the vector expression as shown by Eq. 5:

$$Z(j\omega) = [e^{-j\omega(N-1)\tau} - e^{-j\omega(N-2)\tau} \; \ldots \; -1]' \cdot S(j\omega) = 0. \quad (5)$$

The output of the beam-nulling system, Z(jω), is equal to zero, and the signal is nulled. In this spatial signal processing function, the undesired in-band interference can be filtered based on its AoA. To control the direction of the null, r can be easily varied by filtering the undesired signal from any direction. It is to be noted that in the beam-forming case, there is a desired signal in which the receiver steers towards its direction and suppresses other directions.

Figures 5A, 5B:
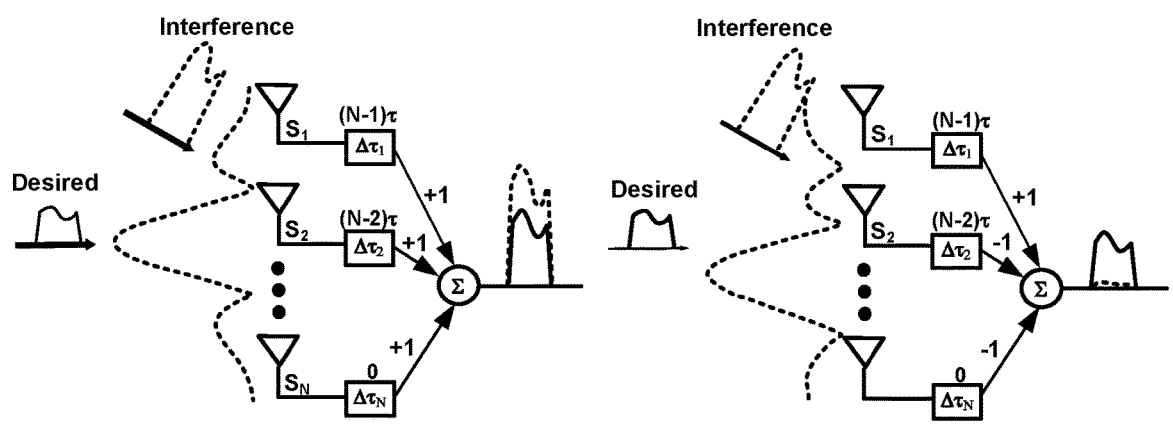
FIG. 5A illustrates beamforming of desired signals for a large modulated BW multi-antenna receivers (RXs).
FIG. 5B shows beam-nulling of interference signals for a large modulated BW multi-antenna receivers (RXs).

If there is a high-power interference located in non-zero points of the beamforming gain (at the worst case, one of the sidelobes), the interference signal(s) is not filtered enough and can potentially block the communication with the desired transmitter, as shown in FIG. 5A. To solve this issue, a beam-nulling mode is implemented in the receiver to filter the high-power interference and receive the desired signal, as shown in FIG. 5B. It is to be noted that the desired signal is affected by the beam-nulling conversion gain, depending on both the desired and undesired AoA. The destructive combination which is half of the channels (signals) being subtracted from the other half (signals) in the beam-nulling implementation is chosen to maximize the desired signal gain. A limitation of the beam-nulling technique at BB is that the BB TTD implementation comes with the linearity overhead on the RF front end (RFFE), as the strong undesired signals must be down-converted without affecting the weak desired signal SNR.

Figure 6:
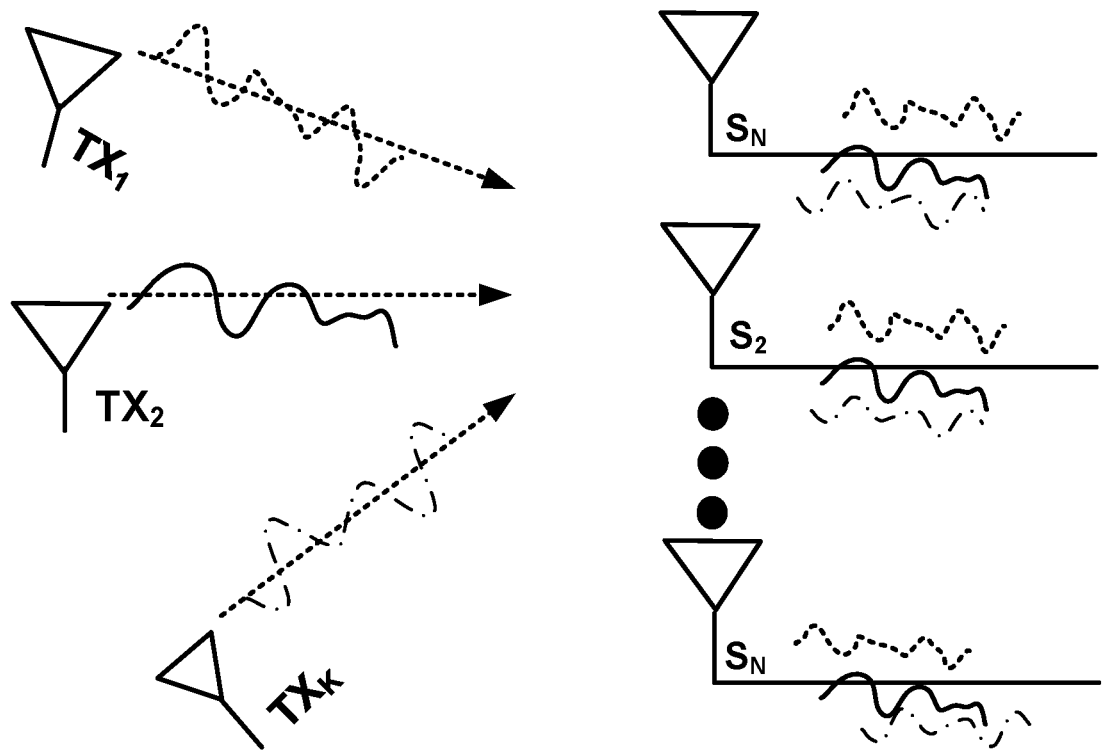
FIG. 6 illustrates a true-time delay (TTD) array cancelling multiple independent interferences.

Multiple Independent Interference Filtering:

It is to be noted that beam-nulling is a solution for filtering an interference with a specific angle of arrival (AoA). Beam-nulling can offer multiple combinations for the interference cancellation to overcome limitations due to array gain dependent on the angle of incidence of the interference and the desired signal, however all the combinations null the same interference. This limitation can be solved using a simultaneous multiple independent interference cancellation solution. A generalized approach to cancel multiple interferences in an N-element receiver is shown in FIG. 6, where $K_{max}=log_2(N)$ with $K_{max}$ being the maximum number of transmitters.

Each transmitted signal is received at the receiver with its own unique array vector ($V_1(j\omega), \ldots, V_i(j\omega), \ldots, V_K(j\omega)$), where i=1 . . . , K and $K \leq K_{max}$. The constant $\tau$ makes the array vector entries to form a geometric sequence with scale factor of 1 and the common ratio of $e^{-j\omega\tau}$. This property offers a unique decomposition of the array vector through the Kronecker product of $K_{max}$ sub-vectors as shown by Eq. 6:

$$V_i(j\omega) = [1 \, e^{-j\omega\tau_i} \, \ldots \, e^{-j\omega(N-1)\tau_i}]' = \quad (6)$$
$$[1e^{-j\omega\tau_i}]' \otimes [1e^{-j\omega 2\tau_i}]' \, \ldots \, \otimes [1e^{-j\omega(N/2)\tau_i}]'$$

where i is the array index, $N=2^{K_{max}}$, and $\otimes$ denotes the left Kronecker product. In this operation, the entire first matrix is multiplied by each entry of the second matrix. Because any array vector $V_i(j\omega)$ can be decomposed into $K_{max}$ 2×1 sub-vectors, there will be $K_{max}$ 1×2 unique vectors that each null one of the decomposed 2×1 sub-vectors. The Kronecker product of any 1×(N/2) random vectors with the $K_{max}$ 1×2 vectors can null the entire decomposed array vector. For example, the 1×2 vector that can null the first sub-vector of the first transmitter array in Eq. 6 is:

$$[e^{-j\omega\tau_1} - 1] \otimes A(j\omega)[1\, e^{-j\omega\tau_1} \, \ldots \, e^{-j\omega(N-1)\tau_1}]' = \quad (7)$$
$$[e^{-j\omega\tau_1} - 1][1\, e^{-j\omega\tau_1}]' \otimes \widehat{A(j\omega)} = 0 \otimes \widehat{A(j\omega)} = 0$$

where $\widehat{A(j\omega)}$ is a new random vector and does not affect the outcome of the nulling. Similarly, the 1×2 vector that can null the decomposed sub-vector of the second transmitter array can be expressed as $$[e^{-j\omega 2\tau_1} - 1] \otimes B(j\omega)[1\, e^{-j\omega\tau_1} \, \ldots \, e^{-j\omega(N-1)\tau_1}]' = \quad (8)$$
$$[e^{-j\omega 2\tau_1} - 1][1\, e^{-j\omega 2\tau_1}]' \otimes \widehat{B(j\omega)} = 0 \otimes \widehat{B(j\omega)} = 0$$

where $\widehat{B(j\omega)}$ is a new random vector and does not affect the outcome of the nulling.

The final cancellation vector in this instance ($F_1(j\omega)$) for the $K=K_{max}$ scenario can be written as shown by Eq. 9:

$$F_1(j\omega) = [e^{-j\omega\tau_1} - 1] \otimes [e^{-j\omega 2\tau_2} - 1] \otimes \ldots \otimes [e^{-j\omega(N/2)\tau_{K_{max}}} - 1]. \quad (9)$$

The subscript in $F_1(j\omega)$ shows the first possible solution, as there are $K_{max}$ possible unique solutions depending on which order is chosen to null the sub-vectors (or which transmitter is called $TX_1$, $TX_2$, and so on. For a specific implementation with four elements, two independent interferences can be cancelled ($K_{max}=log_2 4=2$. The two possible solutions to cancel the interferences in this four-element receiver are as $$F_1(j\omega) = [e^{-j\omega\tau_1} - 1] \otimes [e^{-j\omega 2\tau_2} - 1] = \quad (10)$$
$$[e^{-j\omega(\tau_1+2\tau_2)} - e^{-j\omega(2\tau_2)} - e^{-j\omega\tau_1} 1]$$

$$F_2(j\omega) = [e^{-j\omega\tau_2} - 1] \otimes \quad (11)$$
$$[e^{-j\omega 2\tau_1} - 1] = [e^{-j\omega(2\tau_1+\tau_2)} - e^{-j\omega(2\tau_1)} - e^{-j\omega\tau_2} 1].$$

It is to be noted that the outcome of Eq. 9 is a non-uniform delay implementation, in contrast with the constant inter-element delay implementation for the beamforming and beam-nulling cases.

Figure 7:
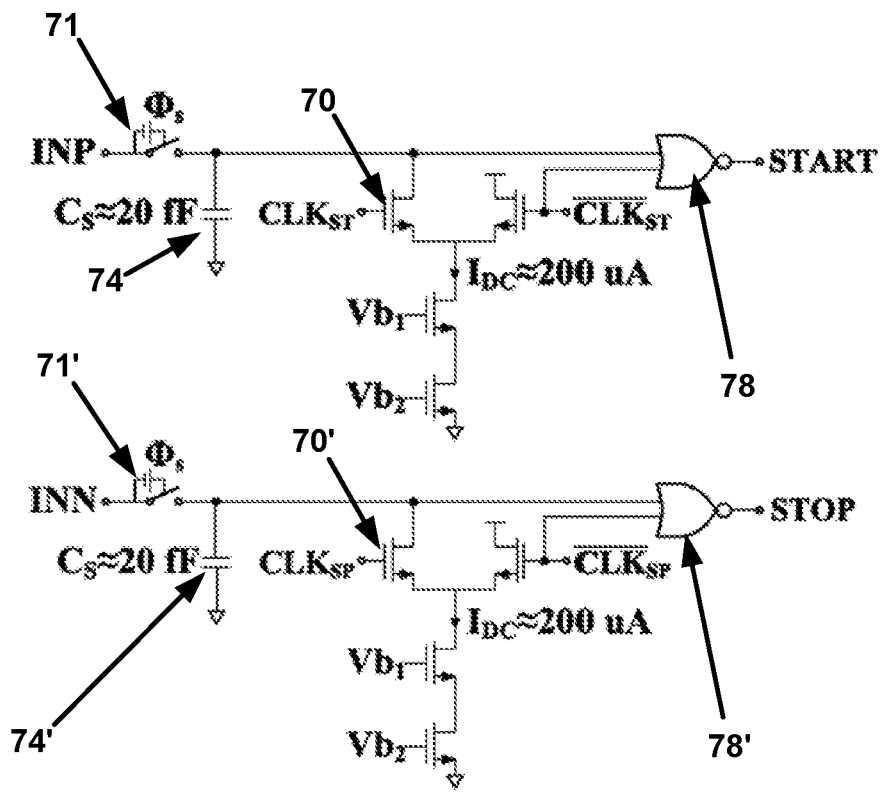
FIG. 7 shows a schematic of the differential voltage-to-time converter (VTC).

Discrete-Time Voltage-to-Time Converter (VTC):

FIG. 7 shows a single-ended implementation of the voltage-to-time converter (VTC). In the VTC presented in FIG. 7, the differential input continuous-time voltages denoted as INP and INN are sampled on the sampling capacitors ($C_S \approx 20$ fF) 74 and 74' respectively when the switch $\Phi_S$ 71 and 71' are closed. During this sampling, the output pulses (denoted as START) and (denoted as STOP) of the VTC are low. When the reference phases (denoted as $CLK_{ST}$) and phases (denoted as $CLK_{SP}$) rise, the capacitors 74 and 74' are respectively disconnected from their respective inputs and begin to discharge by the constant current $I_{DC}$ (=200 pA) through Vb$_1$ and Vb$_2$, as shown in FIG. 7.

Based on the sampled values on the capacitors 74 and 74', there will be $T_{OUT}$ amount of time delay between the times that capacitors voltages cross the comparator 78 and 78' reference voltage on each side. The comparator outputs (START/STOP) are triggered and rise when the crossing happens. This way, the continuous-time input voltages 70 (INP) and 70' (INN) are first sampled and are then converted to a delay between START and STOP. The input-output characteristic of the VTC can be expressed as shown by Eq. 12:

$$T_{OUT}[k] = \frac{C_s}{I_{DC}} V_{IN}[kT_s]. \quad (12)$$

The conversion gain of the VTC calculated from Equation 12 is equal to $C_S/I_{DC}=100$ μs/V. The bootstrapped switch 71 (and 71') enhances the linearity and allows up to $1_{Vpp,diff}$ input voltage range while sampling at 1 GS/s (giga-sample/sec). When two VTCs are time-interleaved for a first channel of a receiver, the VTC reference clocks are connected to $\sigma_1$ and $\sigma_2$, respectively, and the rest of the VTCs of the processor are connected to the previous VTC output pulses for signal combination.

A high-power interference signal in cascaded VTCs cause the largest nonlinearities in the first stage i.e., in the pair of VTCs connected to the first input. This stage dominates the overall linearity as its nonlinearities propagate through the entire chain and will be present at the final time-domain value i.e., at the output of the last VTC of a processor. Any non-idealities in the first VTC of a processor can potentially get amplified by the following stages and reduce the overall performance. In the presented embodiment, same VTCs have been used for all the stages of the processor 100, as shown in FIG. 3, and the overall voltage to time conversion is optimized and not the voltage of the individual stages.

Figure 8:
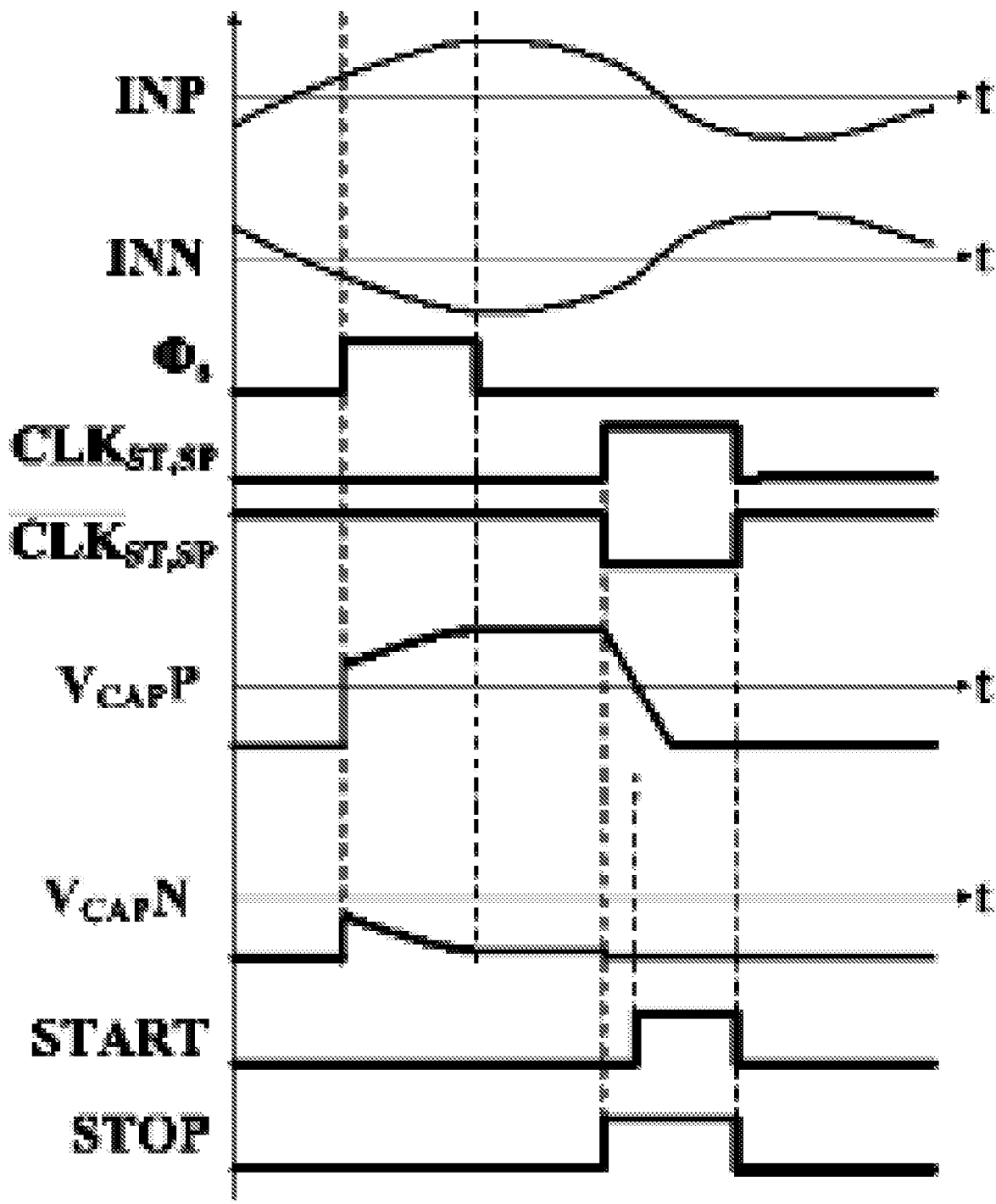
FIG. 8 shows VTC operation with non-overlapping sampling and reference phases with respect to the operation of the voltage-to-time converter (VTC) shown in FIG. 7.

FIG. 8 shows VTC operation with non-overlapping sampling and reference phases with respect to the operation of the voltage-to-time converter (VTC) shown in FIG. 7. In the sampling phase i.e., when the switches 71 and 71' are closed ($\Phi_S$=1) both the capacitors 74 and 74' track the input voltages (INP) and (INN) respectively, while both the output pulses START and STOP are zero. By turning off the sampling switches 71 and 71', i.e., opened ($\Phi_S$=0), the capacitors 74 and 74' hold the sampled value, while the outputs are still low. It is to be noted that when the reference phases, $CLK_{ST}$ and $CLK_{SP}$ arrive, if the sampled value on the capacitor ($V_{CAPP}$ or $V_{CAPN}$) is less than the NOR gates 78 and 78', as shown in FIG. 7, threshold voltage, the corresponding output rises, while the other output remains low.

In further detail, for the example of differential VTC operation shown in FIG. 8, first the value of $V_{CAPN}$ becomes lower than the NOR gates 78' threshold voltage and the output STOP corresponding to $V_{CAPN}$ rises, while the output START corresponding to $V_{CAPP}$ remains low. $V_{CAPP}$ begins to discharge by the constant current source. The moment $V_{CAPP}$ reaches the NOR gate 78 threshold voltage, the output START rises. Thus, it is to be noted that the continuous-time input voltages are sampled and then converted to two pulses such that the delay between them is proportional to the difference between the sampled values. The falling edge of the reference clocks synchronizes the output 72 and 72' falling edges. Thus, the delay between the rising events of the output is only of interest.

Figure 9:
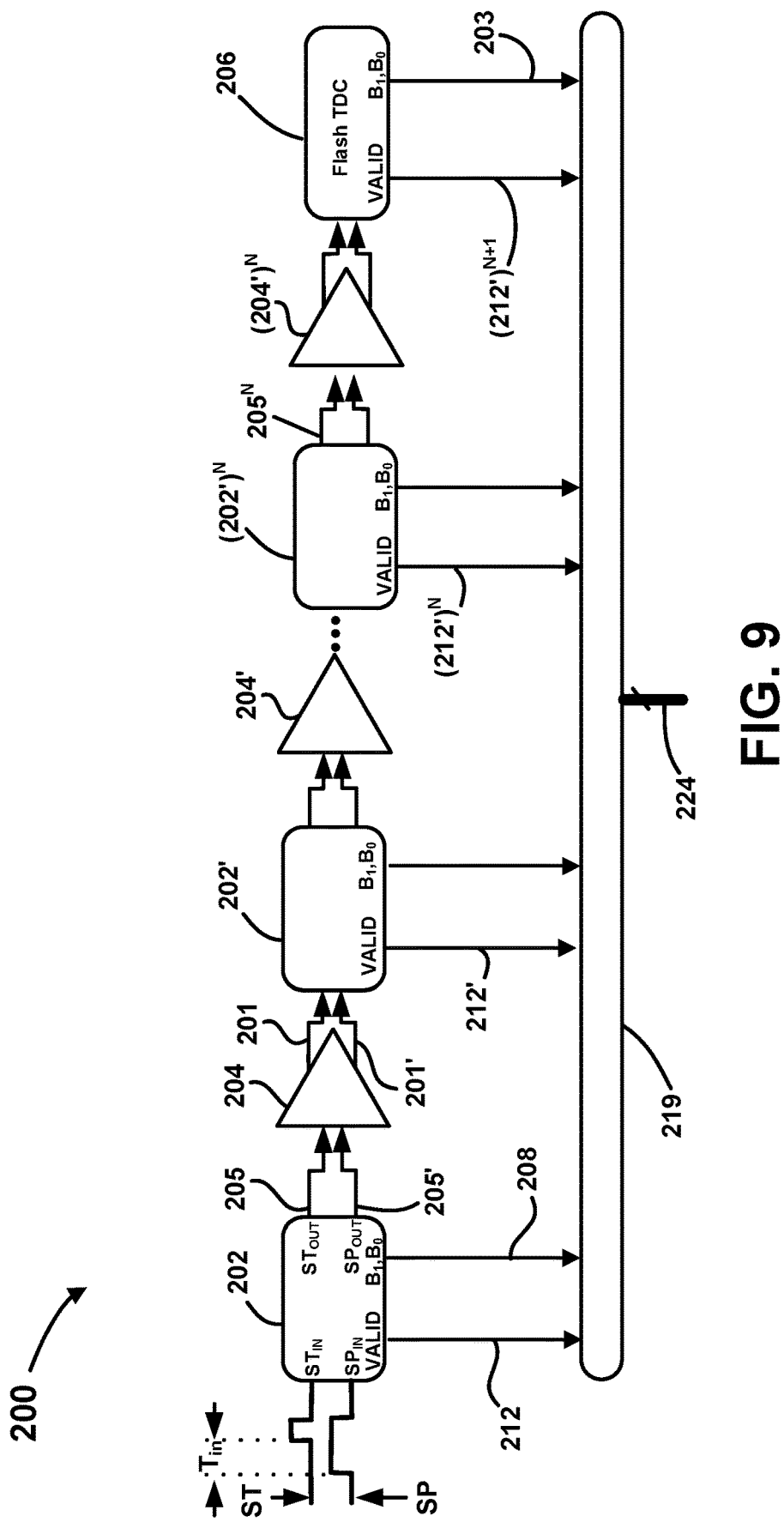
FIG. 9 shows an illustrative block diagram of an asynchronous pipeline time-to-digital converter (TDC), as disclosed herein.

Asynchronous Pipeline Time-to-Digital Converter (TDC):

Turning to the asynchronous pipeline time-to-digital converter (TDC) topology shown in FIG. 9. Such a beneficial asynchronous pipeline TDC converter, as generally shown by the reference numeral 200, is configured to include, but not just limited to, a plurality of residue stages 202, 202' . . . 202$^N$, deemed one or more time amplifiers 204, 204' . . . 204$^N$ with a gain that is most often a gain of two, configured to be followed by a respective residue stage (e.g. time amplifier 204 is coupled to inputs of residue stage 202'), and a 2-bit flash TDC 96 implemented herein to quantize the time-domain spatially processed output of Voltage to Time converters (VTCs), (note that VTCs disclosed herein are also discussed in the description of FIG. 3).

Operationally, input time-domain pulses START (ST) and STOP (SP) with a time-delay of (shown as $T_{IN}$) are first applied to inputs (now denoted as $ST_{IN}$ and $SP_{IN}$) of a first residue stage 202. Two raw bits ($B_1$, $B_0$) 208 with the most significant bit (MSB) value are thereafter extracted and a pair of residue values 205 (also denoted as $ST_{OUT}$) and 205' (denoted as $SP_{OUT}$) generated. Residue values (205, 205') are then first amplified through a time amplifier (TA) 204 and then applied as time-domain inputs (201, 201') to the next residue stage 202'. This trend continues until the last residue stage (202')$^N$, wherein the output value 205$^N$ is amplified by the last TA 204$^N$. By this point all bits except the last two bits are extracted (note that more bits can also be applicable). To reduce the power consumption by additional residue stages and time amplifiers, a 2-bit flash TDC 206 is used to extract the last two raw bits with the Least Significant Bit (LSB) 203. Besides the MSB and the residue value at each residue stage 202, 202' . . . (202')$^N$ and the LSB 216 at 2-bit flash TDC 206, an asynchronous pulse 212, 212' . . . (212')$^N$, (212')$^{N+1}$ (also denoted as VALID) is generated for proper timing of the raw bits combination in the digital error correction (DEC) block 219 which outputs the final digital output (denoted as $Bit_{OUT}$) 224.

Figure 10A:
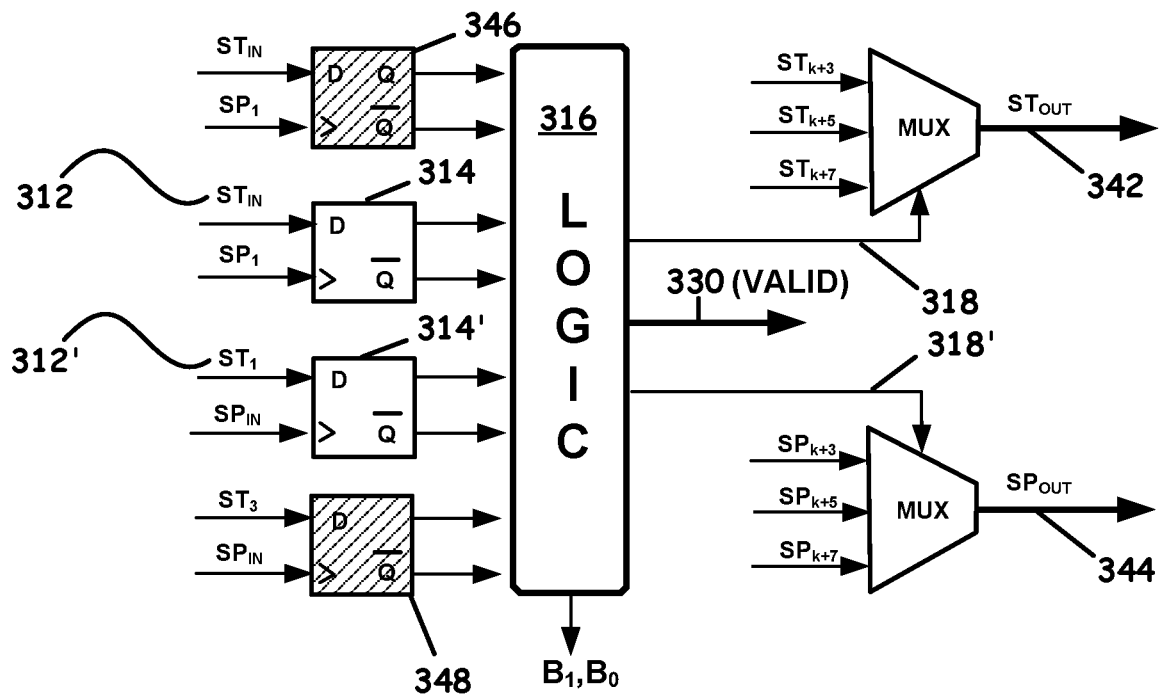
FIG. 10A shows an example architecture of a 1.5-bit residue stage for the embodiments herein.
Figure 10B:
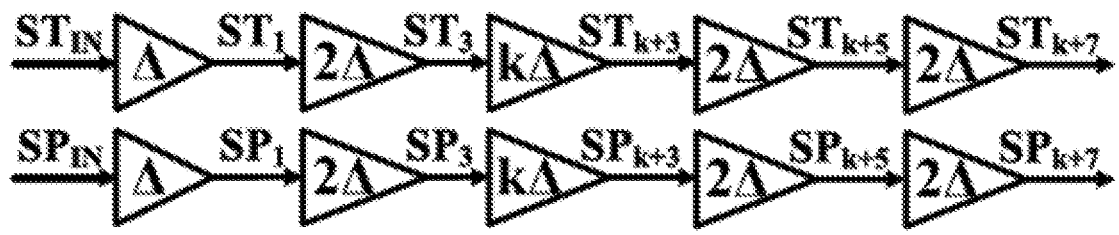
FIG. 10B shows an example delay having an example configured inter-stage delay of $\Delta$=40 ps.

FIG. 10A illustrates an example implementation of a 1.5-bit stage for residue generation of the embodiments herein. In such an implementation, the operation region is detected by comparing the different delayed versions of the input pulses (denoted as $ST_{IN}$ and $SP_{IN}$) through a time-domain comparator (e.g., 314, 314' . . . ). The time-domain comparator is an arbiter that detects early or late arrival of one input compared with the other one. The delayed version of the input pulses $ST_{IN}$ and $SP_{IN}$ (Respective Ref. Characters 312, 312' for clarity) is generated through a delay line, as shown in FIG. 10B. The delay line is implemented with an example inter-stage delay of, for example, but not limited to, $\Delta$=40 ps. Based on the arbiter 314, 314' time-domain comparator outputs, the LOGIC unit 16 determines the operation region and generates the raw bits 318 and 318'. After the region detection and the bit extraction, the LOGIC unit 16 also generates the asynchronous VALID pulse 330 as the operation validation. The VALID pulse 330 is the outcome of the case that all the arbiters 314, 314' . . . have settled to their final result. The residue generation which is the controlled shift in the input time value $T_{IN}$ (not shown) is performed by selecting the different delayed version of input pulses as the output $ST_{OUT}$ 342 and $SP_{OUT}$ 344. Also shown in FIG. 10A are extra time comparators 346, 348 (also shown as patterned) added to limit the output residue value range when desired and as further discussed in detail below.

Figure 11:
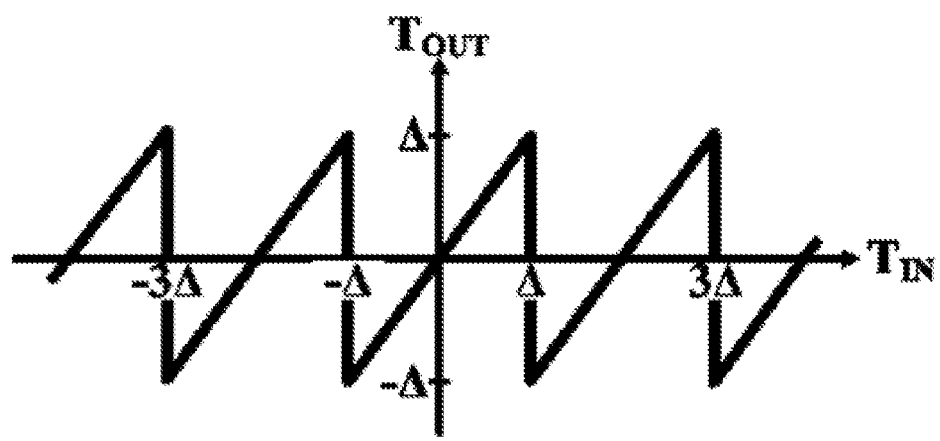
FIG. 11 shows input-output characteristics of the example 1.5-bit architecture of FIG. 10A.

FIG. 11 illustrates the input-output characteristics of the example 1.5-bit residue stage of FIG. 10A. Without the extra time comparators 346, 348, the output residue range can get as high as ±3$\Delta$, and this directly affects the TA linearity. To avoid the bottleneck of TA linearity, adding the two extra time comparators is justified with minimal power penalty. The output residue value $ST_{OUT}$ 342 and $SP_{OUT}$ 344 are amplified by a factor of two and applied to the following stage. It is to be noted that as the output range of the first residue stage is ±$\Delta$, the second residue stage input range is limited to ±2$\Delta$ and hence, the extra comparators will not be needed in the second residue stage. This range limitation applies to the third and fourth residue stages as well. For this reason, two extra time comparators are only needed in the first residue stage.

Figure 12:
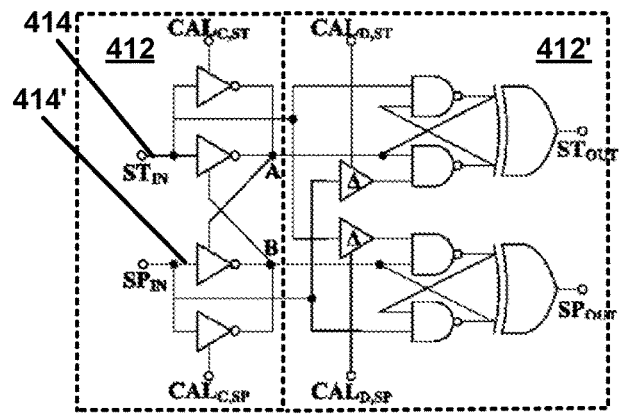
FIG. 12 shows the architecture of a companding-expanding time amplifier (TA).

Referring to the block diagram of the time amplifier (TA) 120 in FIG. 12. It is to be noted that the linearity of TA determines the overall TDC linearity and consequently, its signal-to-noise-distortion-ratio (SNDR). To enhance the linearity of TA, two TAs with different input-output characteristic are combined in 120. The block diagram of the combined TA has a gain of two. In this implementation, two sub-TAs 12 and 12' are combined to increase the overall time amplification linearity. The sub-TA 12 is the companding sub-TA and the sub-TA 12' is the expanding sub-TA in FIG. 12.

Figure 13A:
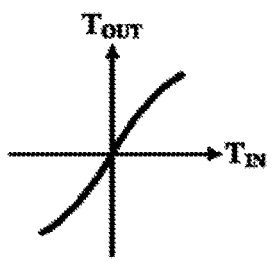
FIG. 13A shows the transfer characteristic of the companding sub-time amplifier (TA).

The companding sub-TA 12 is based on multipath discharging. This is shown in the transfer characteristic of the companding sub-TA in FIG. 13A. In this technique, both the inputs $ST_{IN}$ 14 and $SP_{IN}$ 15 are inverted through two inversion paths, where one of the paths is enabled by the inverted version of the other input. In the presented TA 120, inverted version node A 14' of $ST_{IN}$ 14 enables or disables one of the discharging paths of the other input $SP_{IN}$ 15 and consequently, varies the delay from $SP_{IN}$ 15 to node B 15'. This variation in the discharging power results in time amplification with a gain of approximately two. This approximation is mostly valid for small values of input but for larger input values the gain begins to drop.

Figure 13B:
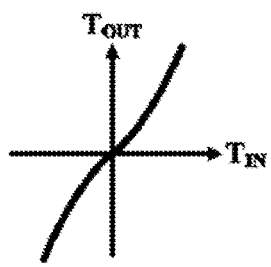
FIG. 13B shows the transfer characteristic of the expanding sub-time amplifier (TA).
Figure 13C:
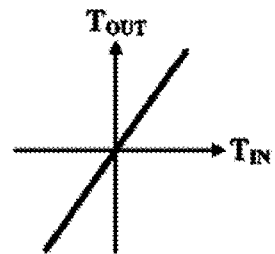
FIG. 13C shows the transfer characteristic of the companding-expanding time amplifier (TA).

The expanding sub-TA 12' is metastability-based and is implemented through cross-coupled NAND gates resulting in an expanding characteristic. This expanding characteristic of the expanding sub-TA is shown in FIG. 13B. By combining the two different characteristics shown in FIG. 13A and FIG. 13B, the TA linearity is enhanced as shown in FIG. 13C and consequently, the TDC SNDR is improved. It is to be noted that for both the sub-TAs calibration is required to maintain the required SNDR with the process, voltage and temperature (PVT) variations. As an alternative configuration, the sub-Tas can have tuning capabilities (e.g., tuning knobs) to vary linearity characteristics. Particle Swarm Optimization (PSO) block 36 of FIG. 3 is used to calibrate the two sub-TAs detailed below.

Figure 14A:
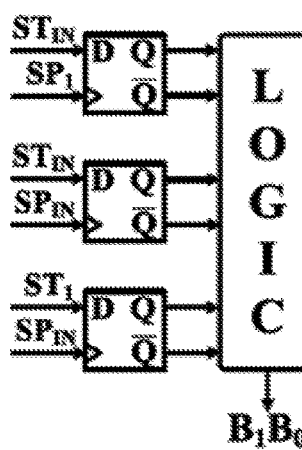
FIG. 14A shows an architecture for a 2-bit flash time-to-digital converter (TDC), as disclosed herein.
Figure 14B:
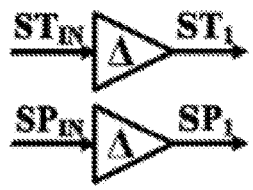
FIG. 14B shows an example delay line for the 2-bit flash time-to-digital converter (TDC) architecture.
Figure 14C:
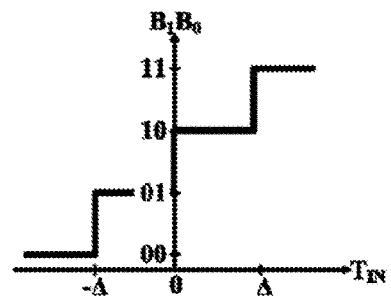
FIG. 14C shows the transfer characteristic for the 2-bit flash time-to-digital converter (TDC).

Referring to the block diagram of the 2-bit flash TDC 400 in FIG. 14A. It is to be noted that the flash TDC works as the residue stage. Different delayed versions of the input to the 2-bit flash TDC are processed as shown in FIG. 14B. These different delayed versions are compared in block 400 in FIG. 14A to get the output bits of the TDC. The input-output characteristics of the 2-bit flash TDC are as shown in FIG. 14C. The pipeline nature of the implemented TDC requires a careful bit combination, performed in a timely manner. The found raw bits of the residue stages of the flash TDC 400 are stored in D flip-flops clocked with the VALID pulse from each stage. After time alignment of the raw bits, they are added with 1-bit redundancy to ensure the proper pipeline quantization, similar to the conventional pipeline voltage-domain ADCs.

Example: Four-Element Baseband Discrete-Time Time-Domain Spatial Signal Processor (SSP)

Figure 15:
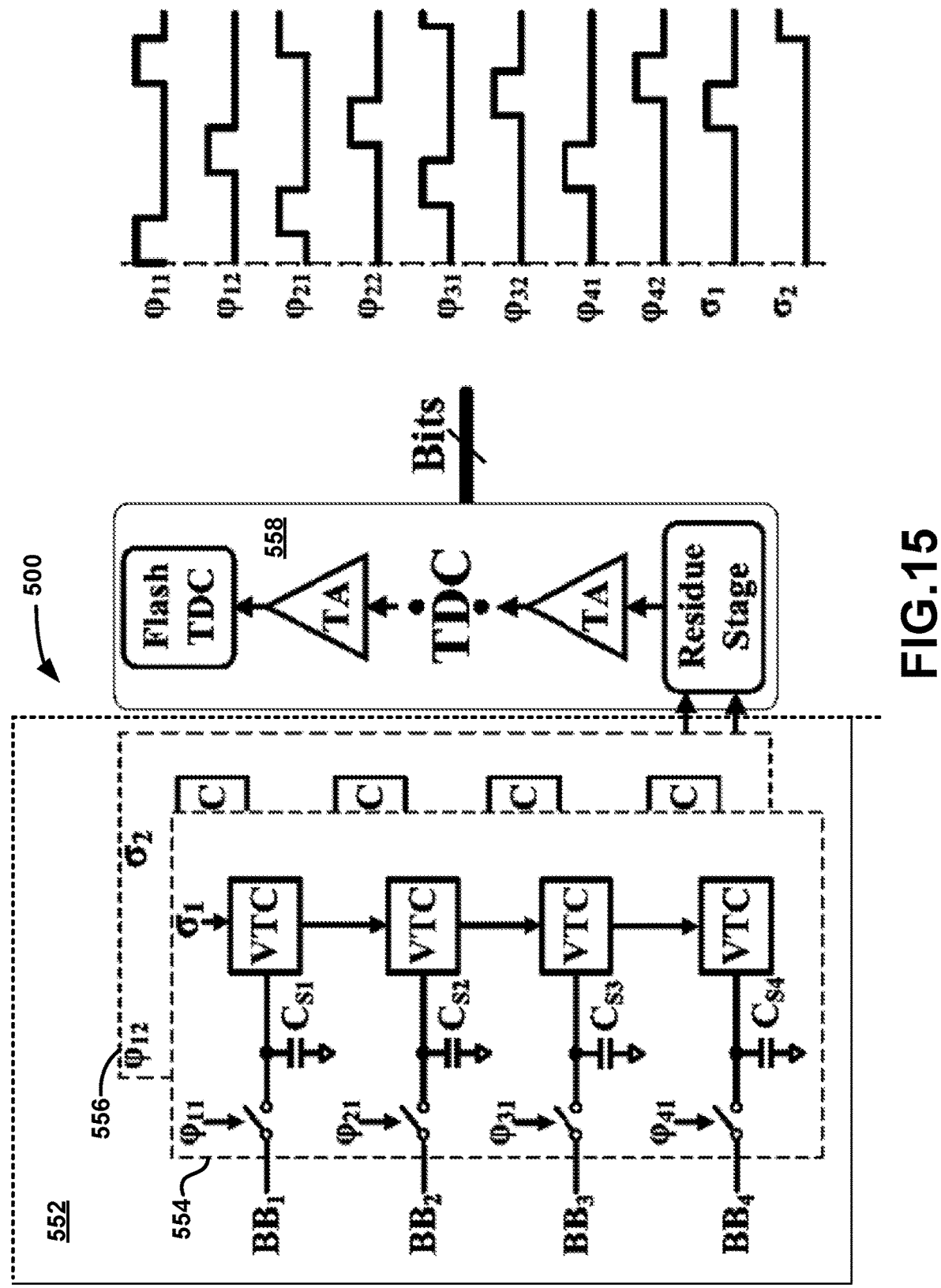
FIG. 15 shows an illustrative system diagram and operation for a four-element (four-array) BB discrete-time time-domain SSP where four signals phase-shifted and down-converted to BB signals are received as input signals.

However, for illustrative purposes to aid in understanding the beneficial aspects of the embodiments herein FIG. 15 shows such a non-limiting reduced to practice system-level diagram of a four-element (four-array) BB discrete-time time-domain SSP 500 where four signals phase-shifted and down-converted to BB signals are received as input signals (denoted as $BB_1$, $BB_2$, $BB_3$ and $BB_4$). The example but beneficial embodiment presented is with a 500 MHz modulated bandwidth, a sampling rate of 1 GS/s, and a 1-ns delay compensation range through two-levels of time-interleaving. The SSP block presented herein is capable of beamforming, beam-nulling and two independent interference cancellation modes. The implementation of true-time-delay (TTD) of the presented SSP shown in FIG. 15 includes the aforementioned voltage-to-time converter (VTC) block 552 and time-to-digital (TDC) block 558 as achieved in the clock path through a voltage-controlled delay line in VTC block 552. The amplitude response of the TTD implementation herein purely depends on the capacitor and dc current mismatch, and the delay value does not affect the amplitude.

The presented example embodiment shown in FIG. 15 of the time-domain SSP 500 is capable of three different processing modes. In Mode 1, the processor 500 receives appropriate sign vector from the SSP Sign Vector block, (as discussed above for FIG. 3) to implement a beamforming mode. All the BB signals are time-aligned through the delay compensating technique implemented by the voltage-to-time converter block 552 for SSP 500. The BB signals are added constructively after time alignment. By changing the sign vector provided to the processor, half of the received signals are subtracted from the other half after time-alignment to achieve beam-nulling in Mode 2. In Mode 3, Kronecker decomposition of the array vectors is implemented and $\log_2$ (N) independent interferences are filtered (i.e., the Kronecker decomposition finds an array of delay compensating values and filter one or more independent interference signals). The TTD elements in Mode 3 are not uniformly spaced i.e. the inter-element delay is not constant for each pair of consecutive elements. The TTD elements are calculated after the Kronecker decomposition. The sign vector and the required TTD elements for the four-element RX SSP 500 are calculated using Equations 10 and 11 shown above.

The signal combinations in the embodiment herein, are performed in the time domain. The VTC block 552 includes two sub-blocks 554 and 556 to produce two outputs of START and STOP. In each of this sub-block, the first sampled BB input is converted to a time-domain pulse by the first VTC using the reference clock $\sigma_1$ (or $\sigma_2$). The first VTC converts the first sampled voltage to a delay between the reference clock value and its output. By applying the output of the first VTC to the second one, the time-domain information of the second input, which is the time-domain representation of the second sampled value, is added (or subtracted) to the first one. In other words, the delayed version of reference clock is applied to the second VTC to produce a new delay proportional to the second sampled voltage and is added (or subtracted) to the delay produced by the first VTC. This translates to combining the first two inputs either constructively or destructively and converting to a delay between the CLK and the output pulse of the second VTC. By continuing this trend for the remaining VTCs, all the input signals are added (or subtracted) in the time-domain at the output of the last VTC.

The time-domain output of the last VTC which includes all the sampled input information, is then digitized through an asynchronous pipeline TDC block 558 for further digital processing. At each residue stage of the TDC, two raw bits (corresponding to Most Significant Bit) are extracted, and a residue value is generated and amplified by the TA for the following stages. The 2-bit flash TDC extracts the remaining bits (corresponding to the Least Significant Bit). In the end, all the bits extracted from different stages are combined in a specific timely manner to reconstruct the complete digital data.

Measurement Results

Figure 16:
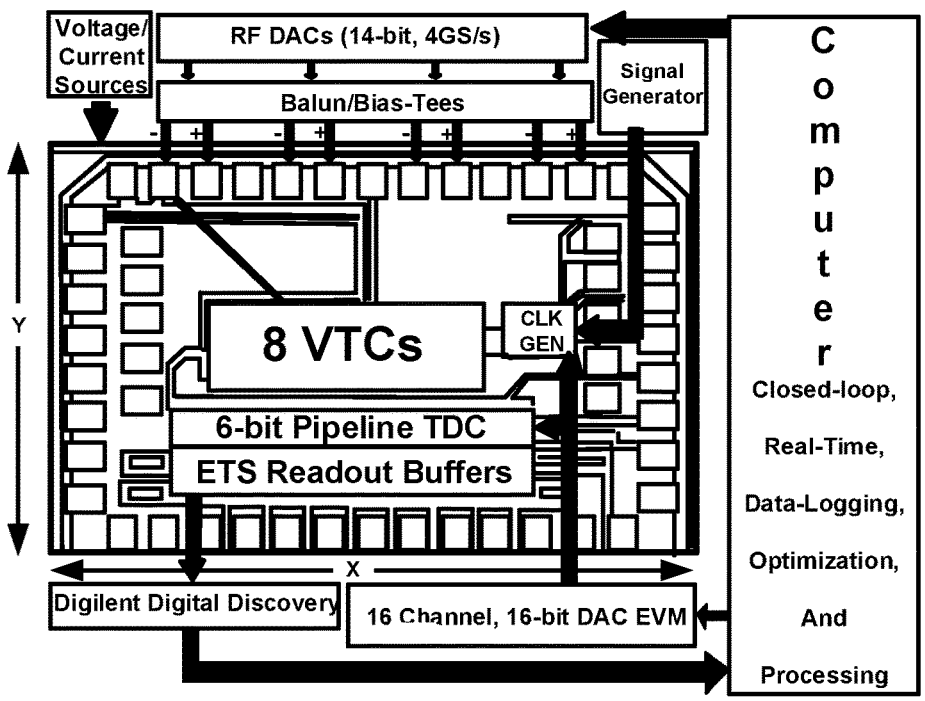
FIG. 16 shows a die micrograph and test setup used for the four-element baseband time-domain spatial signal processor, as disclosed herein.

FIG. 16 illustrates graphically, a reduced to practice die micrograph and test setup for an example 4-element BB TTD SSP, now generally referenced by the numeral 600, as disclosed herein. Such an example die micrograph is implemented in a 65-nm TSMC process in an area of 0.82 mm$^2$ with only 0.31 mm$^2$ active core area. The example beneficial processor 600 is packaged in a Quad-Flat No (QFN) Leads packaging. All the input signals are MATLAB generated and then uploaded to a Xilinx ZCU111 Evaluation Board. The signals are applied to the device under test (DUT) after dc biasing using bias tees.

The reference 1-GHz clock is provided off-chip from n HP8664A signal generator. Through this reference clock, the required time-interleaved phases for sampling during the voltage-to-time conversion are generated on-chip. The implemented inter-element delays are controlled externally through a 16-bit Texas Instruments (TI) DAC evaluation Module (DAC81416EVM). The TI DAC is also used to tune the TA calibration nodes.

Finally, the output digital data is read at a lower speed (40-MHz clock rate, 25×lower than the ADC operation speed) through a Digilent Digital Discovery board. To reconstruct the original data from the low-speed read-out, an equivalent time sampling (ETS) technique has been used followed by post-processing in MATLAB. The ETS readout technique is commonly used in digital sampling oscilloscopes, where the input data are sampled at a lower rate, stored in the memory, and displayed later after the original data reconstruction.

Each channel's input-to-output characteristic is measured by applying a constant amplitude signal to each input (one at a time) and observing the digital output amplitude (e.g., wherein a pilot signal is applied to the time-to-digital converter and based on its characteristics the calibration is performed). The gain mismatch between the channels is initially calibrated by equalizing each input amplitude. After the channel mismatch calibration, the TDC and, specifically, the TAs are calibrated through Particle Swarm Optimization (PSO) in the closed loop.

The Particle Swarm Optimization (PSO) is performed one time before the normal operation of the chip. The PSO helps to find the best operation point of the TA in order to calibrate it. In the PSO, 400 particles are used, representing 400 possible solutions for the TA calibration node voltage values. A single-tone input is applied to the chip, and the TDC SNDR is measured and stored for all the 400 possible solutions. Based on the outcome SNDR of each of the 400 particles for one iteration, the location of the particles that result in lower SNDR values is changed toward the particles with higher corresponding SNDR values in the next iteration. This trend is continued for a number of desired iterations, e.g., 12 or more iterations, until all the particles are close enough to the maximum possible value for the SNDR of the TDC.

Figure 17:
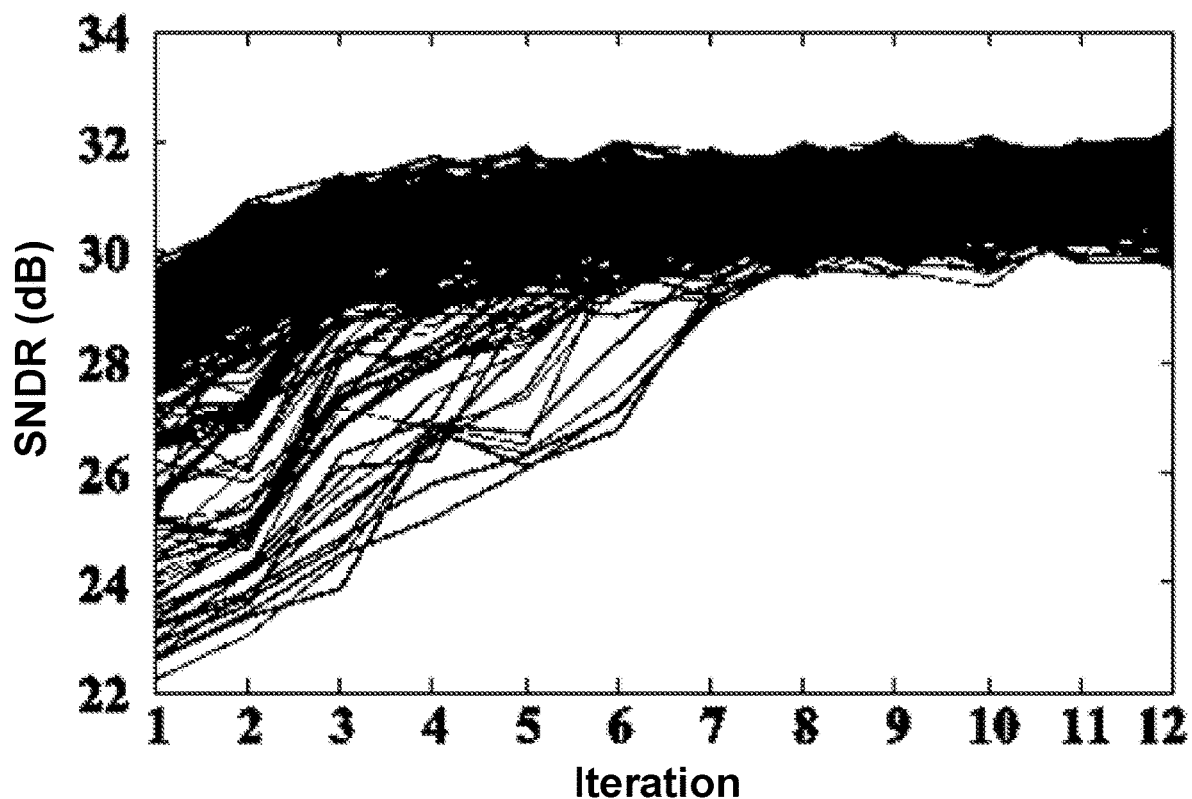
FIG. 17 shows a plot of signal-to-noise-distortion-ratio (SNDR) values of all the particles versus an optimization iteration.
Figures 18A, 18B:
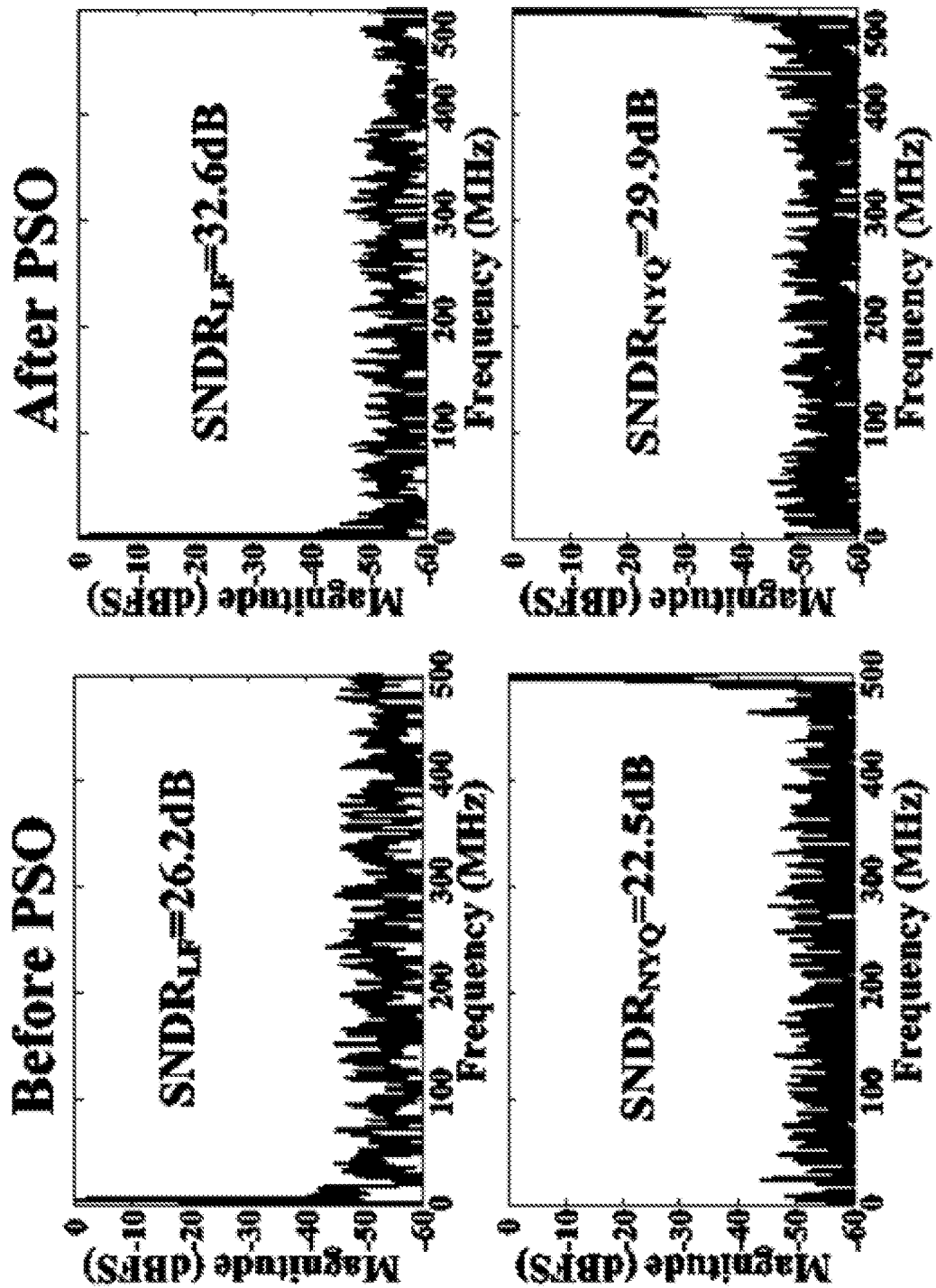
FIG. 18A shows time-to-digital conversion (TDC) linearity enhancement through the before Particle Swarm Optimization (PSO).
FIG. 18B shows time-to-digital conversion (TDC) linearity enhancement through the after Particle Swarm Optimization (PSO).

The SNDR value of all the particles versus the optimization iteration is as shown in FIG. 17, where, after each iteration, the particles are getting closer and closer to the maximum possible SNDR. The SNDR enhancement before and after Particle Swarm Optimization (PSO) can be seen in FIG. 18A and FIG. 18B, where, for both cases of low frequency and Nyquist input the signal-to-noise-distortion-ratio (SNDR) increases by more at least 6.4 dB through this optimization. However, such an improvement is over the case where the hardware is not calibrated. Surprisingly and unexpectedly, upon calibration the SNDR is often up to 34 dB or even higher, depending on a desired input frequency.

The example 4-element BB TTD SSP implemented has been tested for the three processing modes: beamforming, beam-nulling and multiple independent interference cancellation; and various types of input, including single-tone, wideband, and modulated signals. The RF-FE block of the receiver is operating at the 1.5-GHz center frequency, with antenna spacing of $\lambda/2$ (10 cm) and ±90° angle (AoA) coverages. These numbers result in a maximum inter-element delay of 1 ns/3 and the overall delay range of 1 ns.

Figure 19A:
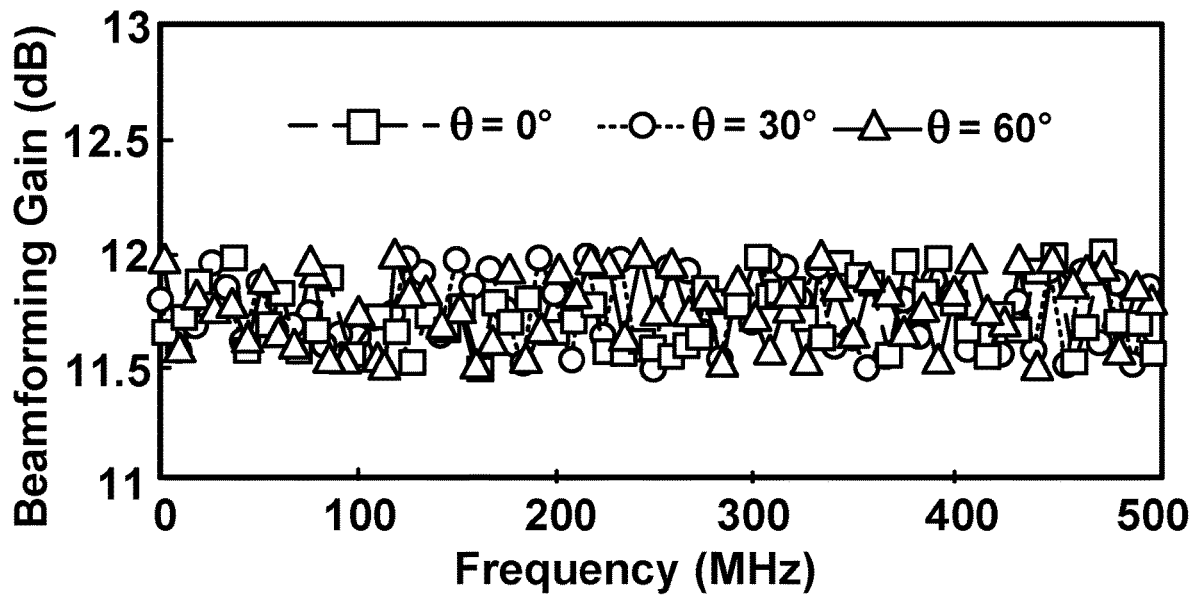
FIG. 19A shows the measured single-tone test results of conversion gain versus input signal frequency in the beamforming mode
Figure 19B:
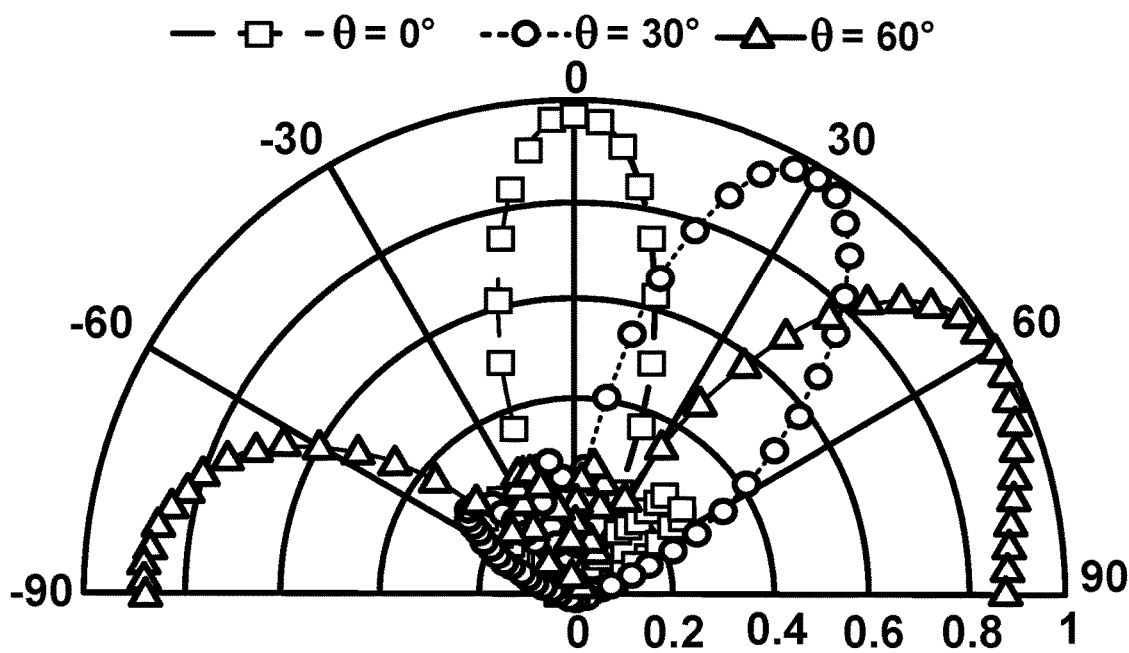
FIG. 19B shows the measured single-tone test results of beam patterns for the three different angel of arrivals (AoAs) in the beamforming mode.

Referring to FIG. 19A, the measurement result of the chip in the beamforming mode and for a swept single-tone input signal is presented. For three cases of desired AoA including 0°, 30°, and 60°, frequency-independent beamforming gain of close to 12 dB is measured across the 500-MHz bandwidth. The jitter in the sampling phases and limited TDC resolution are the main reasons for the small variation in the beamforming gain. For the three cases of desired AoA including 0°, 30°, and 60°, the beamforming beam patterns of the implemented SPP are shown in FIG. 19B. The frequency-independent beamforming conversion gain and the beam-squinting free beam patterns depict the TTD-based operation of the SSP.

Figure 20A:
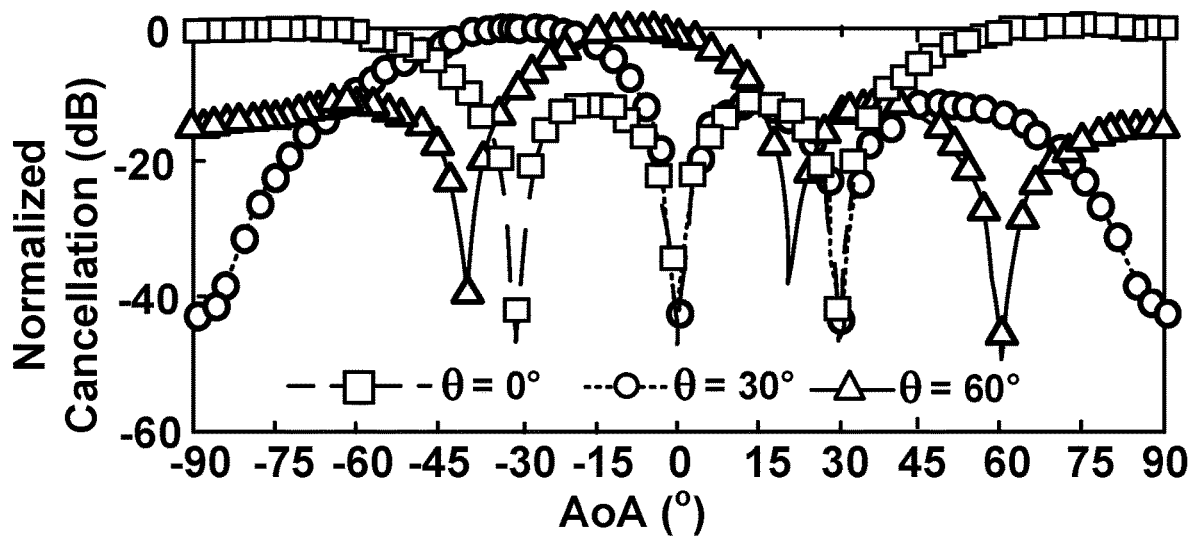
FIG. 20A shows the measured single-tone test results of conversion gain versus input signal frequency in the beam-nulling mode.
Figure 20B:
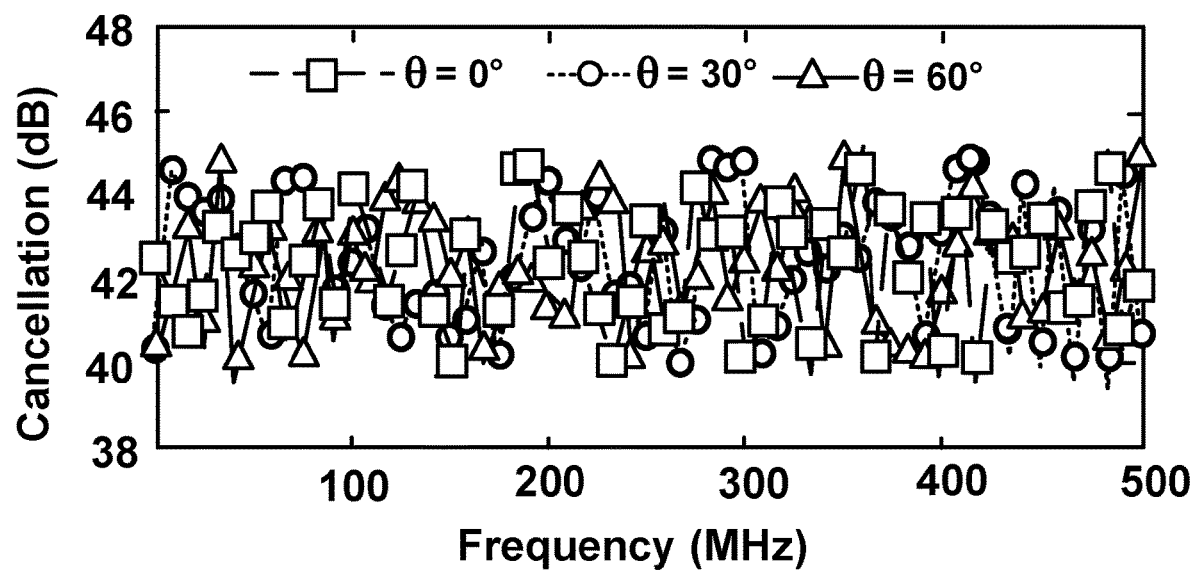
FIG. 20B shows the measured single-tone test results of cancellation for the three different angel of arrivals (AoAs) in the beam-nulling mode.

FIG. 20A and FIG. 20B show the beam-nulling conversion gain versus the input signal frequency for the same single-tone test as above performed for beam-nulling mode and the beam-nulling patterns of the TTD SSP for the three cases of interference AoAs including 0°, 30°, and 60°, respectively. More than 40-dB interference cancellation is observed for the implemented time-domain SSP across the entire bandwidth, in the beam-nulling mode. The deep angular nulls generated in the beam pattern in FIG. 20B, shows the implemented SSP providing high-performance beam-nulling.

Figure 21A:
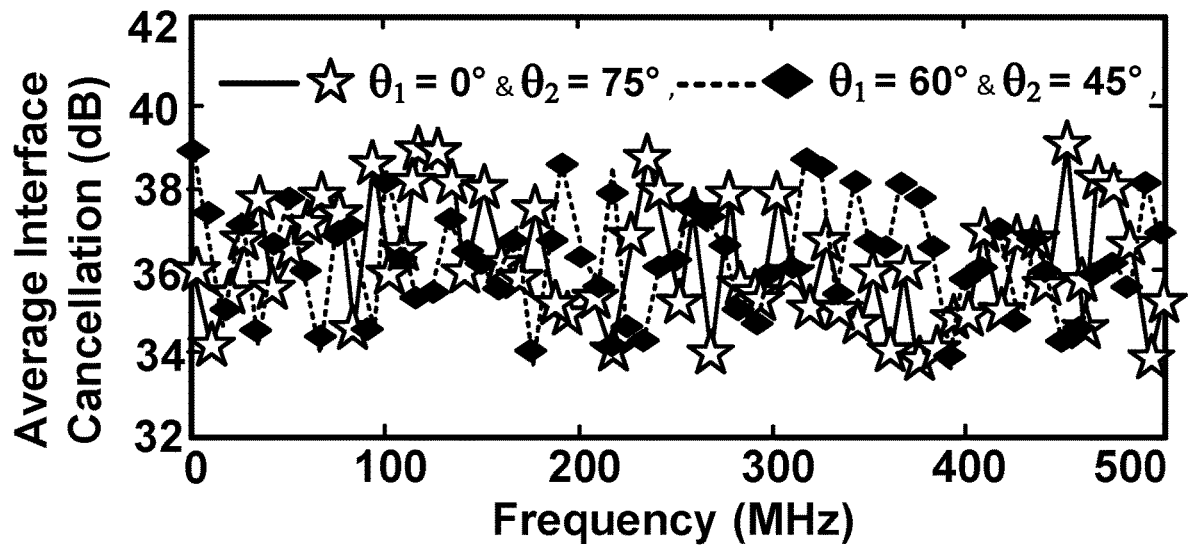
FIG. 21A shows the measured single-tone test results of average cancellation versus frequency in Mode 3.
Figure 21B:
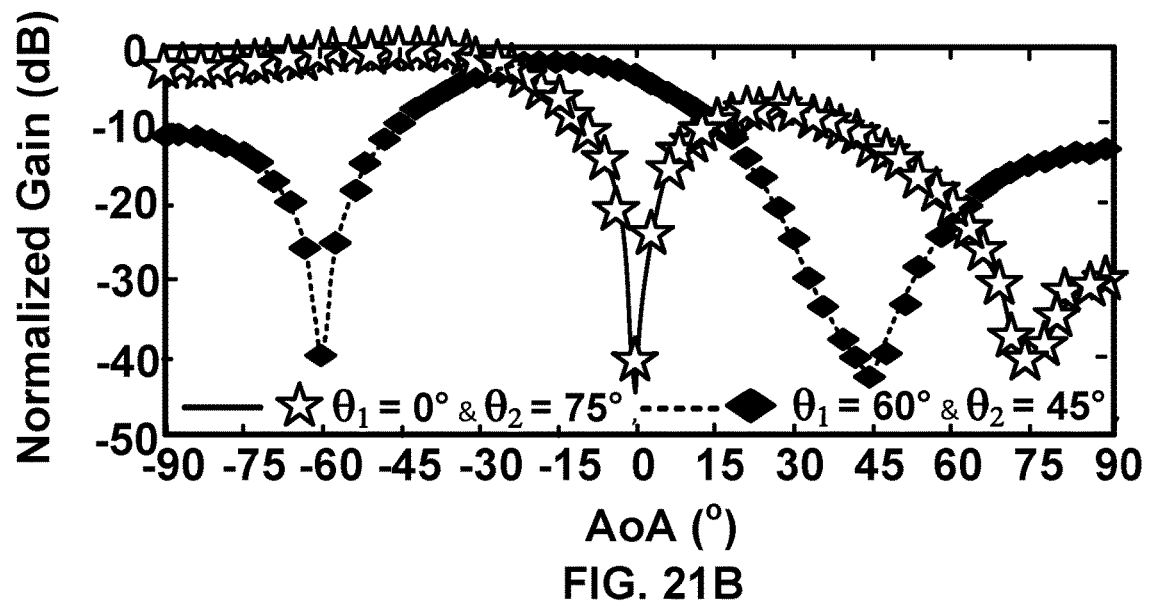
FIG. 21B shows the measured single-tone test results of angular response for two pairs of interference AoA.

FIG. 21A and FIG. 21B show the time-domain SSSP validation results for the two independent interference cancellation modes, where two undesired input signals with different AoAs are applied to the chip, and the SSP filters both the undesired signals. In FIG. 21A, specifically the average cancellation of the undesired signals is plotted versus their single-tone frequencies, for two different pairs of interference AoA. On average, more than 34-dB cancellation is measured in Mode 3, proving the high-performance capability of the implemented SPP design. The angular domain response of the processor for the two different pairs of AoA is plotted in FIG. 21B, where two independent nulls are generated in both the pairs. In both cases, two deep nulls are generated in both the interferences AoA.

Figure 22A:
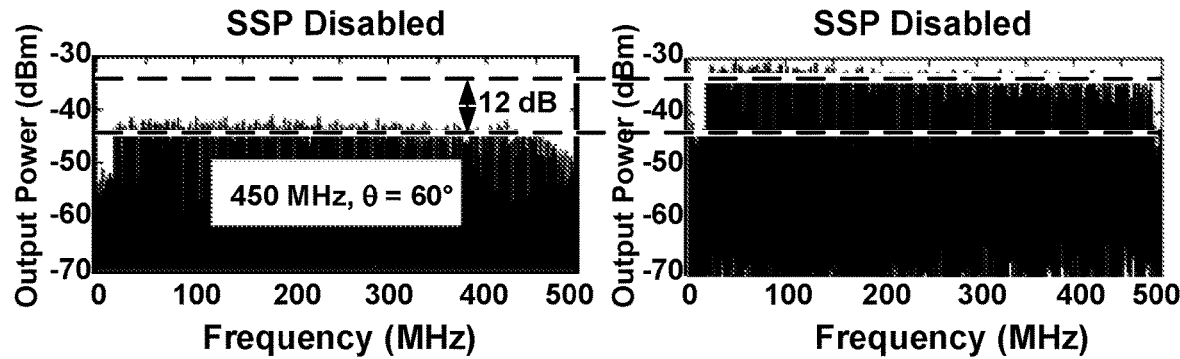
FIG. 22A shows the measured performance with wideband signals in a beamforming mode.
Figure 22B:
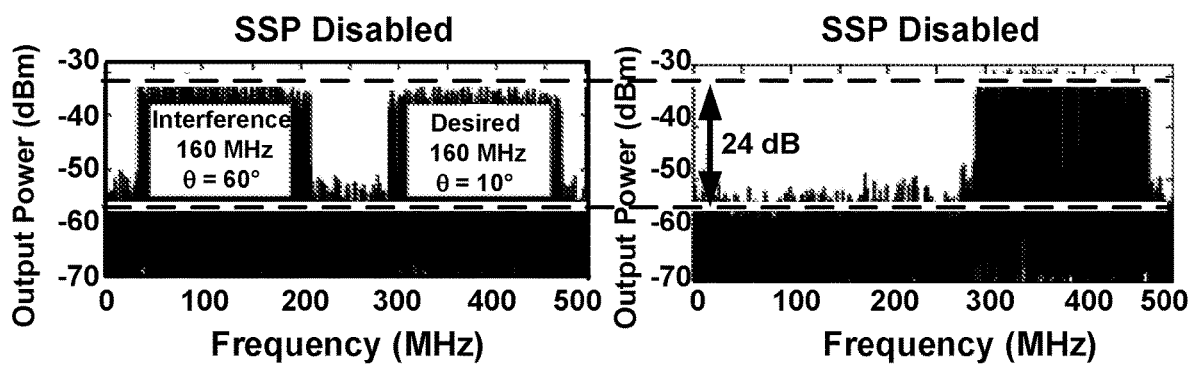
FIG. 22B shows the measured performance with wideband signals in a beam-nulling mode.
Figure 22C:
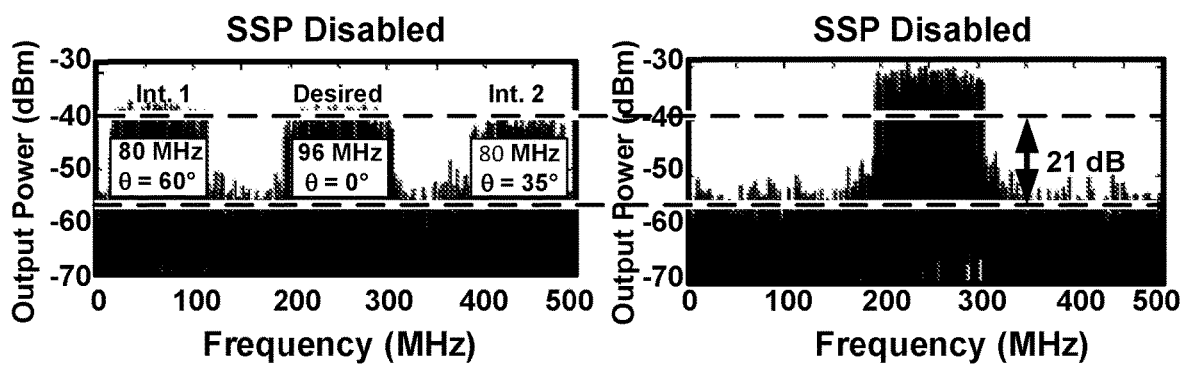
FIG. 22C shows the measured performance with wideband signals in two independent interference cancellation modes.

FIG. 22A, FIG. 22B and FIG. 22B show the measurement performance of the implemented SSP tested with wideband input signals in the presented three processing modes respectively. FIG. 22A shows the wideband input measurement results for beamforming mode. In the beamforming mode, frequency-independent roughly 12-dB beamforming gain is observed for a 450-MHz wideband input with AoA=60°. The wideband results in FIG. 22A show the TDC performance limitation that folds the distortion components in the desired signal. This problem is avoided by increasing the TDC operating bandwidth or improving the oversampling ratio in the TDC to avoid noise/distortion folding. In the second mode of beam-nulling, two 160-MHz input signals from two different directions are applied to the processor. In this mode, the in-band interference with AoA=60° is filtered by 24 dB, while the desired signal with AoA=10° is preserved in FIG. 22B. Finally, in the third mode, the 96-MHz desired signal with AoA=0° is preserved, while two independent 80-MHz wideband in-band interferences are filtered by more than 21 dB, as shown in FIG. 22C. In this measurement, one interference is arriving from −35° and the other from 60°.

FIG. 23A, FIG. 23B and FIG. 23B show the performance of the implemented SSP measured for wide modulated-bandwidth signals in all three processing modes respectively. In all three modes, the desired 16-QAM 250-Mb/s signal is applied with one or two interferences. In the beamforming mode, a 12-dB stronger single-tone interference is added to the desired signal and placed in a null AoA of the beamforming pattern. The constellation of the desired signal, before and after enabling the spatial signal processing, at the output of the chip is shown in FIG. 23A. After beamforming, 5% EVM is calculated for the desired signal. In FIG. 23B, the constellation of the same desired signal is plotted in presence of a 12 dB stronger 160-MHz wideband interference, before and after enabling the beam-nulling. In this mode, 5.3% EVM is calculated. In the third processing mode, two 80-MHz wideband interferences, each 6 dB stronger than the desired signal power, are added to the desired signal. In this mode, 9.0% EVM is calculated, and the constellation of the desired signal is shown in FIG. 23C. The modulated signals' performance in all the processing modes proves the applicability of the presented SSP for high-speed wireless links.

The implemented SSP consumes 40-mW power including 25 mW for the signal combination through the time-interleaved VTCs, 12 mW for TDC quantization, and 3 mW for sample phase generation using controlled delay lines. The input 1-dB compression point (P1 dB) of this SSP is −0.5 dBm from the desired signal perspective, and its IIP3 is 7.9 dBm. The implemented delay range of 1 ns permits the RF-FE block presented herein to work beneficially at center frequencies as low as 1.5 GHz resulting in >33% fractional bandwidth for the SSP design. The performance to illustrate a beneficial SSP is shown in Table 1 below:

TABLE I

PERFORMANCE OF AN EXAMPLE BENEFICIAL TIME-DOMAIN SSP

| | Present Example Working Embodiment |
|---|---|
| Architecture | TTD Array |
| Implementation | BB |
| # Elements | 4 inputs/1 output |
| Functionality | Beamformer + Multi-Blocker Rejection + ADC |
| Domain | Time |
| Technology | 65 nm CMOS |
| Supply (V) | 1.0 |
| # Elements (N) | 4 |
| Rejection (dB) Single-Tone | 40-46 |
| Modulated BW | 24 |
| Rejection Mod. BW (MHz) | 500 |
| Beamforming Mod. BW (MHz) | 500 |
| TTD Range (ns) | 1 |
| Operational Frequency Range (GHz) | 1.25-1.75 |
| Fractional BW (Mod. BW/RF Carrier Frequency) | 33.3% (0.5 GHZ/1.5 GHz) |
| Linearity $P_{1dB}$ (dBM) | −0.5 (Canc. OFF) |
| IP3 (dBM) | 7.9 |
| Noise Performance | 32.6 dB SNDR |
| Power (mW) | 25 (8 VTCs) |
| | 12 (TDC) |
| | 3 (Clock) |
| | 40 Total |
| Area (mm²) | 0.82 |
| | 0.31 (active) |

As shown in Table 1 above, the demonstrated four-element BB discrete-time time-domain SSP implementing a time-based system-level design approach for wideband beamforming, beam-nulling, and independent filtering of multiple interferences offering TTD-based processing has a high fractional bandwidth capability the highest ever reported. The implementation presented herein is the only solution with multiple interference cancellation and embedded TDC. Time amplification linearity enhancement is presented by combining different time amplifier structures. The time-domain processor chip is fabricated, and functionality is proven though various measurements as included herein. Wideband frequency-independent BB spatial processing, in the beamforming, beam-nulling, and two independent interference cancellation modes is validated and presented by applying swept single-tone, wideband, and modulated signals to the chip.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example(s) chosen for purposes of disclosure and covers all changes and modifications which do not constitute departures from the true spirit and scope of this invention.

We claim:

1. A multiple element (N-element) baseband (BB) time-domain spatial signal processor, comprising:
   a plurality of in series voltage-to-time converters integral to the N-element baseband (BB) time-domain spatial signal processor and configured to time-align and combine one or more received continuous-time baseband signals to result in one or more interference free intended signals; and
   a pipeline converter integral to the N-element baseband (BB) time-domain spatial signal processor and configured to quantize the intended signals received from the plurality of voltage-to-time converters.

2. The N-element baseband (BB) time-domain spatial signal processor of claim 1, wherein the plurality of in series voltage-to-time converters are configured to relate the one or more received continuous-time baseband signals to one or more time-domain output pulses, wherein the one or more time-domain output pulses include a time delay proportional to an amplitude value of the one or more received continuous-time baseband signals.

3. The N-element baseband (BB) time-domain spatial signal processor of claim 1, wherein the plurality of in series voltage-to-time converters combine constructively a time-aligned one or more received continuous-time baseband signals for beamforming so as to increase a signal-to-noise ratio of the combined received signal.

4. The N-element baseband (BB) time-domain spatial signal processor of claim 1, wherein the plurality of in series voltage-to-time converters combine destructively a time-aligned one or more received baseband interference signals for a beam-nulling so as to cancel one or more received baseband interference signals.

5. The N-element baseband (BB) time-domain spatial signal processor of claim 1, wherein the processor utilizes a Kronecker decomposition to find an array of delay compensating values and filter one or more independent interference signals.

6. The N-element baseband (BB) time-domain spatial signal processor of claim 1, wherein the pipeline converter is configured as an asynchronous time-to-digital converter, wherein the asynchronous time-to-digital converter further comprises:
   a plurality of residue stages configured to extract raw bits with a Most Significant Bit value from the one or more time-domain output pulses to generate one or more residue values and an asynchronous pulse;
   a plurality of time amplifiers configured to amplify the one or more residue values to a one or more amplified residue values; and
   a 2-bit flash time-to-digital-converter configured to quantize the one or more amplified residue values.

7. The N-element baseband (BB) time-domain spatial signal processor of claim 6, wherein an asynchronous pulse generated at the output of the plurality of residue stages is configured to enable a coherent synchronized output of the plurality of time amplifiers.

8. The N-element baseband (BB) time-domain spatial signal processor of claim 6, wherein each of the plurality of residue stages further comprise a plurality of time-comparators configured to compare the one or more time-domain pulses to generate a residue value in a limited range so as to enhance linearity of the plurality of time amplifiers.

9. The N-element baseband (BB) time-domain spatial signal processor of claim 8, wherein the one or more interference free and quantized signals have a signal-to-noise-distortion ratio of at least 6.4 dB.

10. The N-element baseband (BB) time-domain spatial signal processor of claim 6, wherein the time-to-digital converter further comprises a Digital Error Correction block configured to combine the raw bits extracted from the plurality of the residue stages and the 2-bit flash time-to-digital converter.

11. The N-element baseband (BB) time-domain spatial signal processor of claim 6, wherein a particle swarm optimization is configured to calibrate the plurality of time amplifiers.

12. The N-element baseband (BB) time-domain spatial signal processor of claim 10, wherein one of the sub-time amplifiers from the pair of sub-time amplifiers are configured as one or more NOT gates to achieve a companding input-output characteristic.

13. The N-element baseband (BB) time-domain spatial signal processor of claim 10, wherein one of the sub-time amplifiers from the pair of sub-time amplifiers are configured as one or more cross-coupled NAND gates to achieve an expanding input-output characteristic.

14. The N-element baseband (BB) time-domain spatial signal processor of claim 6, wherein a statistical time-to-digital converter calibration is provided, wherein a pilot signal is applied to the time-to-digital converter for calibration.

15. The N-element baseband (BB) time-domain spatial signal processor of claim 6, wherein each of the plurality of time amplifiers further comprise a pair of sub-time amplifiers further configured as a companding-expanding architecture to enhance the linearity of the plurality of time amplifiers.

16. A time-domain spatial signal processing method, comprising: time-aligning and combining constructively one or more received continuous-time baseband signals in the beam-forming mode;
time-aligning and combining destructively one or more received interference signals in the beam-nulling mode, wherein a plurality of in series of voltage-to-time converters perform the time-aligning and combining of the constructively and destructively one or more received continuous-time baseband signals; and
applying a Kronecker decomposition of array vectors to one or more received interference signals in the multiple independent interference filtering mode, wherein the Kronecker decomposition of array vectors cancels one or more independent interference signals.

17. The time-domain spatial signal processing method of claim 16, wherein the time-aligning and adding destructively step further comprises: subtracting a first half of a plurality of interference signals with a second half of a plurality of interference signals.

18. The time-domain spatial signal processing method of claim 16, wherein the time-domain spatial signal processing method further includes quantizing the time-aligned and combined one or more received continuous-time baseband signals.

19. The time-domain spatial signal processing method of claim 18, wherein quantizing the time-aligned and combined one or more received continuous-time baseband signals step further comprises: extracting raw bits with a Most Significant Bit, generating residue values and generating an asynchronous pulse utilizing a plurality of residue stages.

20. The time-domain spatial signal processing method of claim 18, wherein quantizing the time-aligned and combined one or more received continuous-time baseband signals step further comprises: extracting raw bits with a Least Significant Bit and generating an asynchronous pulse utilizing a 2-bit flash time-to-digital converter.

21. The time-domain spatial signal processing method of claim 18, wherein quantizing the time-aligned and combined one or more received continuous-time baseband signals step further comprises: amplifying residue values utilizing a plurality of time-amplifiers.

* * * * *